United States Patent
Jain et al.

(10) Patent No.: US 10,454,804 B2
(45) Date of Patent: Oct. 22, 2019

(54) APPLICATION CHARACTERIZATION USING TRANSPORT PROTOCOL ANALYSIS

(71) Applicant: Hughes Network Systems, LLC, Germantown, MD (US)

(72) Inventors: Kaustubh Jain, Germantown, MD (US); Chi-Jiun Su, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 316 days.

(21) Appl. No.: 15/344,684

(22) Filed: Nov. 7, 2016

(65) Prior Publication Data

US 2018/0131593 A1    May 10, 2018

(51) Int. Cl.
*G06F 15/16* (2006.01)
*H04L 12/26* (2006.01)
(Continued)

(52) U.S. Cl.
CPC ............ *H04L 43/18* (2013.01); *H04L 12/66* (2013.01); *H04L 43/026* (2013.01); *H04L 43/10* (2013.01);
(Continued)

(58) Field of Classification Search
CPC ....... H04L 67/02; H04L 67/42; H04L 63/061; H04L 43/08; H04L 67/141; H04L 41/22; H04L 43/0882; H04L 47/2441; H04L 63/166; H04L 65/608; H04L 65/80; H04L 41/046; G06T 19/006
See application file for complete search history.

(56) References Cited

U.S. PATENT DOCUMENTS 9,585,037 B1 * 2/2017 Davari ................. H04W 24/08
2006/0168262 A1 * 7/2006 Frazer ..................... H04L 29/06
709/230

(Continued)

OTHER PUBLICATIONS

International Search Report and Written Opinion dated Jan. 24, 2018 by the International Searching Authority (European Patent Office) in PCT Application PCT/US2017/060168.

*Primary Examiner* — Michael A Keller
*Assistant Examiner* — Thao D Duong
(74) *Attorney, Agent, or Firm* — NovoTechIP International PLLC

(57) ABSTRACT

Characterizing transport protocol connections and controlling behavior of a communication network based on the characterizations, including obtaining transport protocol state information for transport protocol packets on a transport protocol connection; identifying request/response periods for the transport protocol connection based on the transport protocol state information, the identifying including identifying a beginning of a first request/response period based on the transport protocol state information for a first forward packet, and identifying an end of the first request/response period and a beginning of a second request/response period based on the transport protocol state information for a second forward packet; associating an application type with a server endpoint based on the identified request/response periods; and controlling behavior of the communication network based on the application type.

20 Claims, 10 Drawing Sheets

(51) Int. Cl.
*H04L 12/66* (2006.01)
*H04L 29/08* (2006.01)
*H04L 29/06* (2006.01)
*H04L 12/851* (2013.01)
*H04L 12/801* (2013.01)

(52) U.S. Cl.
CPC .......... *H04L 47/2441* (2013.01); *H04L 47/34* (2013.01); *H04L 67/02* (2013.01); *H04L 67/42* (2013.01)

(56) References Cited

U.S. PATENT DOCUMENTS

| | | | |
|---|---|---|---|
| 2012/0110110 A1* | 5/2012 | Luna | H04L 67/22 709/213 |
| 2014/0362776 A1* | 12/2014 | Tian | H04W 48/20 370/329 |
| 2015/0341380 A1 | 11/2015 | Heo et al. | |
| 2016/0037509 A1* | 2/2016 | Tiger | H04L 5/0055 370/329 |
| 2016/0094467 A1 | 3/2016 | Hong et al. | |
| 2016/0112544 A1* | 4/2016 | Girard | H04L 47/801 709/230 |

* cited by examiner

APPLICATION CHARACTERIZATION USING TRANSPORT PROTOCOL ANALYSIS

BACKGROUND

In general, network administrators or ISPs (Internet Service Providers) do not have access to end user devices or applications communicating via their networks. Hence, for traffic characterization and classification, they generally rely passively monitoring network traffic, at some intermediate node, in order to classify network traffic for purposes such as better network resource provisioning and QoS (quality of service) prioritization.

Conventionally, such attempts for application-layer characterization have focused on using IP-layer packet statistics, or for unencrypted traffic, deep-packet inspection (DPI) techniques used information in unencrypted packets to read higher layer protocol headers or even packet payload to identify applications. However, with increasing use of encryption (TLS over HTTP/1.1 or HTTP/2), many of the DPI techniques can no longer be used. Newer approaches attempt to identify signatures in packet header or inter-packet statistics, together with additional meta-data, including IP address and DNS (domain name service) lookups. However, most of these approaches are expensive, both in terms of computational resource demands and updates (need newer rules for newer applications or any changes to old applications). Recent solutions have been proposed which make use of machine-learning tools, using supervised or semi-supervised approaches and flow-statistics (for example, connection duration, bytes downloaded, bytes uploaded, etc.) to classify connections. Finally, there are commercial products which combine many of the above techniques to provide solutions. For example, Sandvine provides specialized-hardware boxes which are capable of monitoring significant amounts of traffic and quickly label the connections with appropriate applications or application-classes. However, such products are expensive.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
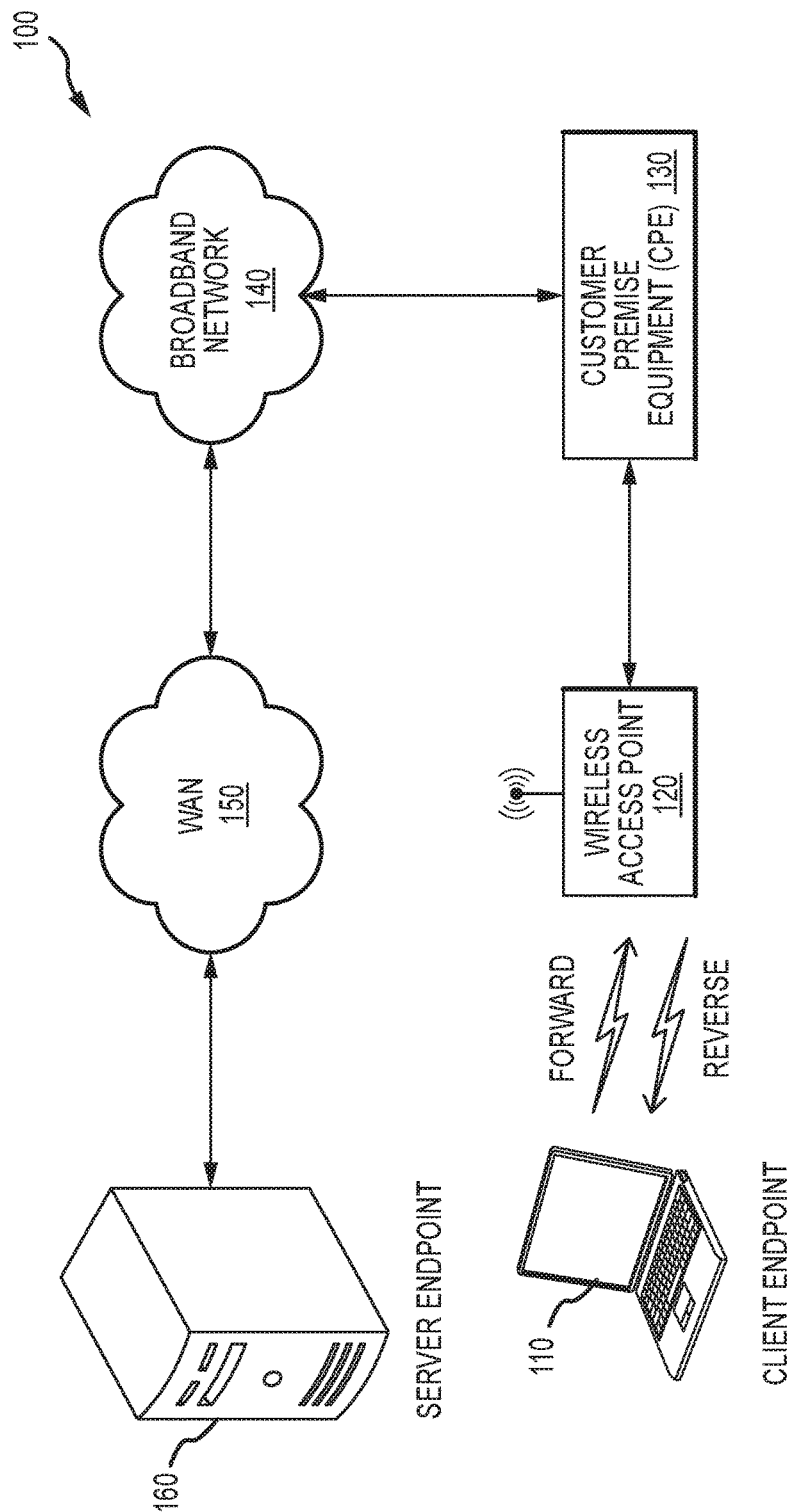
FIG. 1 illustrates an example of a high-level block diagram of a communication network architecture that supports transferring data between endpoints via transport protocol connections established according to one or more connection-oriented transport layer protocols and classifying such connections.

FIG. 1 illustrates an example of a high-level block diagram of a communication network architecture that supports transferring data between endpoints via transport protocol connections established according to one or more connection-oriented transport protocols and classifying such connections. One example of a connection-oriented transport protocol is TCP (Transmission Control Protocol, an OSI Layer-4 protocol). With TCP, data is transferred in units known as "TCP segments" (which may also be referred to as "TCP packets" and are also examples of "Layer-4 packets," "transport layer packets," or "transport protocol packets"). In the case of TCP/IP, TCP segments are transferred via IP (Internet Protocol, an OSI Layer-3 protocol) packets (which may also be referred to as "IP datagrams"); for example, a single TCP segment may be transferred via multiple IP packets. Other examples of connection-oriented transport protocols include, but are not limited to, CubeSat Space Protocol (CSP), DCCP (Datagram Congestion Control Protocol), SCTP (Stream Control Transmission Protocol), SPX (Sequenced Packet Exchange), Structured Stream Transport (SST), Venturi Transport Protocol (VTP), and Xpress Transport Protocol (XTP). It is noted that although various examples are described herein relating to connections established via TCP or other connection-oriented transport protocols, the techniques described herein may be also be applied to other connection-oriented transport protocols and/or where a connectionless transport protocol, such as UDP (User Datagram Protocol) is used, and a connection is established instead according to an OSI Layer-5 (session layer), OSI Layer-6 (presentation layer), or OSI Layer-7 (application layer) protocol, where appropriate data is available in the payloads of connectionless transport protocol packets (for example, data identifying request and response messages and/or retransmission or other control messages). For example, the described techniques may be applied with RTP (Real-time Transport Protocol) and SIP (Session Initiation Protocol) connections established over UDP. As another example, the described techniques may be applied with QUIC (Quick UDP Internet Connections), a transport protocol that establishes streams between endpoints over UDP and uses sequence numbers and acknowledgements.

In the example illustrated in FIG. 1, one or more connections, according to a connection-oriented transport protocol, are established for transferring data between client endpoint 110 and server endpoint 160. For a particular connection, forward packets each including data transmitted by the client endpoint 110 are transferred in a forward direction from the client endpoint 110 to the server endpoint 160, and reverse packets each including data transmitted by the server endpoint 160 are transferred in a reverse direction from the server endpoint 160 to the client endpoint 110. For example, a web browser application program executing on client endpoint 110 may initiate a TCP connection with a web server application program executing on server endpoint 160 for client endpoint 110 to request a resource via HTTP (Hypertext Transfer Protocol, an OSI Layer-7 protocol), and over the TCP connection a client endpoint 110 may transmit a forward packet comprising an HTTP GET request specifying the resource and server endpoint 160 may transmit one or more reverse packets each comprising a portion of the requested resource; the TCP connection may be reused for additional such request/response exchanges. A TCP connection is an example of a "Layer-4 connection," a "transport layer connection," or a "transport protocol connection."

Examples of client endpoint 110 include, but are not limited to, smartphones, tablet computers, desktop computers, notebook computers, server computers, game consoles, network-connected multimedia devices, Internet of Things (IoT) types of devices, or programs executing on such devices. Although only one client endpoint 110 is illustrated in FIG. 1, it is understood that there may be multiple client endpoints that communicate via a single CPE 130. Examples of server endpoint 160 include a server computer, a system comprising multiple server computers, or programs executing on such devices. Although only one server endpoint 160 is illustrated in FIG. 1, it is understood that there may be many additional server endpoints that client endpoint 110, or other client endpoints communicating via CPE 130 or ISP (Internet Service Provider) network 140, may communicate with. In the example illustrated in FIG. 1, client endpoint 110 establishes a connection with server endpoint 160 via a wireless access point (WAP) 120. Although this is illustrative of some configurations, such as a residential installation in which a customer has provided a wireless access point, such as a wireless router, to provide network access for various devices, it is understood that other configurations, whether involving wired or wireless communication, may also be used. Wired data communication between client device 110 and wireless access point 120 (or between client device 110 and CPE 130, in some examples) may be according to, for example, the IEEE 802.3 standards (Ethernet), PLC (power line communication), or MoCA (Multimedia over Coax Alliance) standards.

Wireless access point 120 provides wireless data communication for client devices, such as client endpoint 110. Wireless data communication between client endpoint 110 and wireless access point 120 may be according to, for example, one or more of the IEEE 802.11 media access control (MAC) and physical layer (PHY) specifications for implementing WLAN computer communication, including, but not limited to, 802.11a, 802.11b, 802.11g, 802.11n, 802.11ac, and 802.11ax. The physical layer for wireless access point 120 may be based on, for example, radio (such as Wi-Fi), diffuse light (such as diffuse infrared), directed light (such as steered laser communication). In some examples, wireless access point 120 may operate multiple WLANs. For example, wireless access point 120 may operate a first WLAN on a first band (such as the 2.4 GHz ISM band), and also operate a second WLAN on a different second band (such as the 5 GHz U-NII radio band). As another example, wireless access point 120 may operate a first WLAN on a first channel, and also operate a second WLAN on a different second channel. In some examples, a WLAN may span across multiple wireless access points. In some instances, wireless access point 120 may be a wireless router that further performs the functions of a router. Wireless access point 120 connects client endpoint 110 to the customer premise equipment (CPE) 130.

Figure 3:
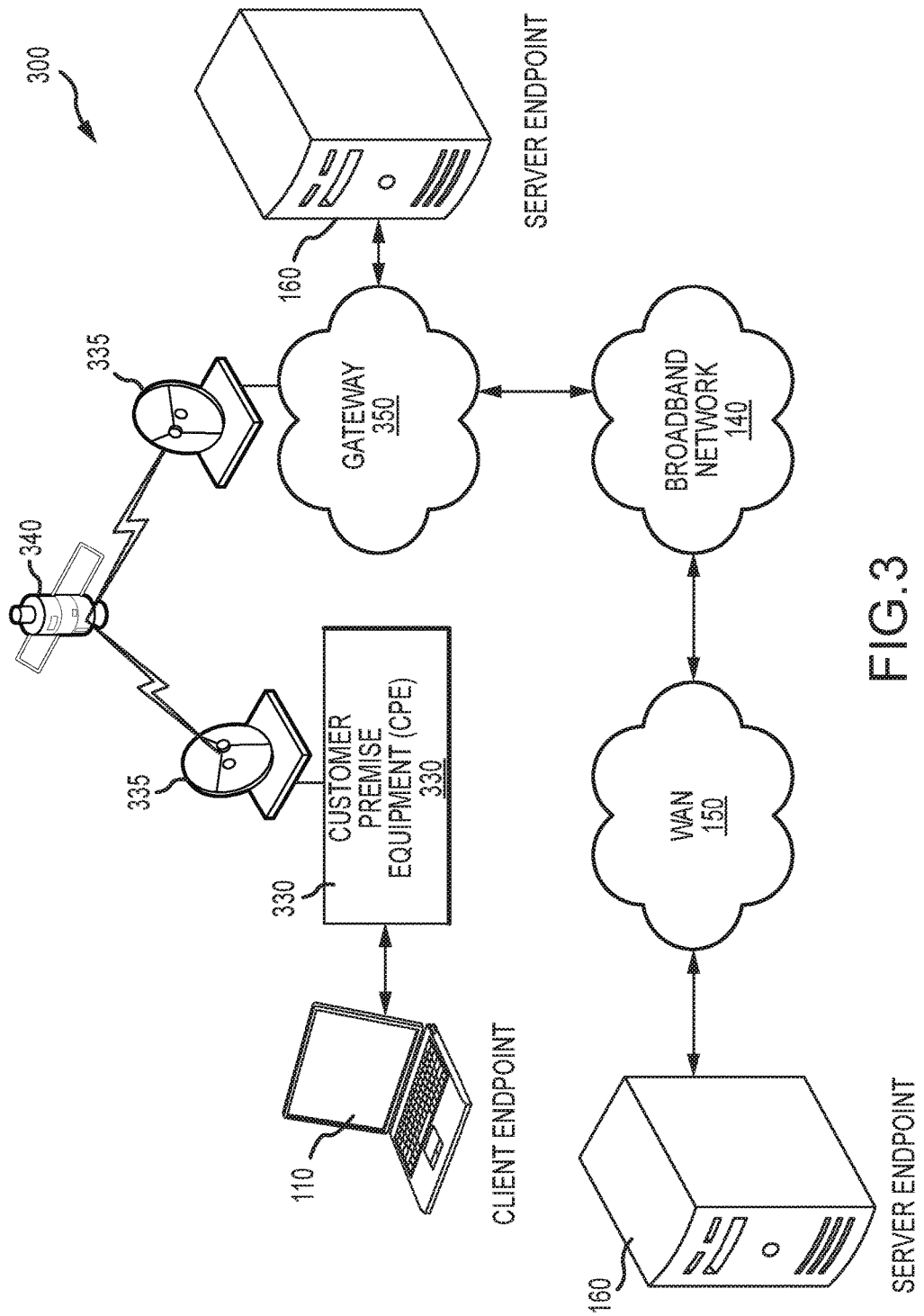
FIG. 3 illustrates an example of a high-level block diagram of a communication network architecture that supports transferring data between endpoints via transport protocol connections established according to one or more connection-oriented transport layer protocols and classifying such connections, in which data packets are transferred via a satellite data communications network.

CPE 130 generally comprises any terminal and associated equipment located at the premises of a client subscriber, which connects client endpoint 110 to a communications service provider network. Although only one CPE 130 is illustrated in FIG. 1, it is understood that there may be additional CPEs used for communication via ISP network 140. CPE 130 may include, for example, devices such as DSL (digital subscriber line) modems, cable modems, satellite modems, telephones, routers, switches, residential gateways, set-top boxes, fixed mobile convergence products, home networking adapters, and Internet access gateways that enable the client subscriber to access services available via the communications service provider network and to distribute the services within the client subscriber's premises or facility (for example, a residential dwelling or a local office). CPE 130 is connected to one or more remote server endpoints (of which only a one remote server endpoint 160 is illustrated in FIG. 1) via an ISP network 140 and wide area network (WAN) 150. In some examples, ISP network 140 may provide communications services via satellite communications services; such an example is illustrated in FIG. 3. An example of WAN 150 is the Internet. To communicate with server endpoint 160, client endpoint 110 may initiate a connection with server endpoint 160 using a connection-oriented transport layer protocol (for example, a TCP connection) via the network architecture illustrated in FIG. 1. Although examples are illustrated relating to an ISP customer device initiating a connection in the forward direction (such as client endpoint 110 initiating a TCP connection with server endpoint 160), the described techniques may similarly be applied to connections initiated in the reverse direction from outside of ISP network 140 (such as a computer system attached to WAN 150) with ISP customer devices; for example, techniques such as port forwarding through a firewall or public IP addresses may allow such connections to be initiated from outside of an ISP network.

In some examples, wireless access point 120 may be configured to perform network address translation (NAT) for client devices, such as client endpoint 110. This is common where IPv4 is used for Layer-3 communication. In such examples, although client devices may each be assigned distinct network addresses on a WLAN provided by wireless access point 120, at CPE 130 all packets sent by, or directed to, the client devices are addressed from or to a network address assigned to wireless access point 120. Although it may still be possible to associate packets with individual network connections (for example, a TCP packet can be associated with a TCP connection via the source address, source port, destination address, and destination port values included in the TCP packet), it may not be possible to determine which client endpoint a particular transport protocol connection is associated with (although identification of a specific client device is optional, as connections may be classified or otherwise analyzed in association with a server endpoint). In some examples, CPE 130, including a proxy executing on CPE 130 (see, for example, proxy 235 executing on CPE 230 in FIG. 2), may obtain information, such as a NAT table provided by wireless access point 120, that allows CPE 130 to determine which client endpoint a particular transport protocol connection is associated with. In examples where there are other wireless access points in addition to wireless access point 120, CPE 130 may be configured to identify which WLAN and/or which wireless access point a transport protocol connection is associated with based on network addresses assigned to each of the wireless access points. In an example where IPv6 is used for Layer-3 communication and/or wireless access point 120 does not perform NAT, CPE 130 may be configured to associate Layer-4 connections with respective client devices based on source or destination address values used for the Layer-4 connections.

In some examples, CPE 130 is configured to collect transport protocol state information for packets observed by CPE 130 (for example, received by CPE 130 and/or routed through CPE 130), which may be used for classifying connection-oriented transport protocol connections. Examples of such statistics that may be collected, and their use for classifying connections, is described in more detail later. In general, the term "capturing" may also be applied to collecting such statistics. It is noted that although CPE 130 may collect these statistics, processing of the collected statistics classifying connections may be performed in full or in part by other network devices, such as wireless access point 120 or a device or devices included in ISP network 140, for example.

Figure 2:
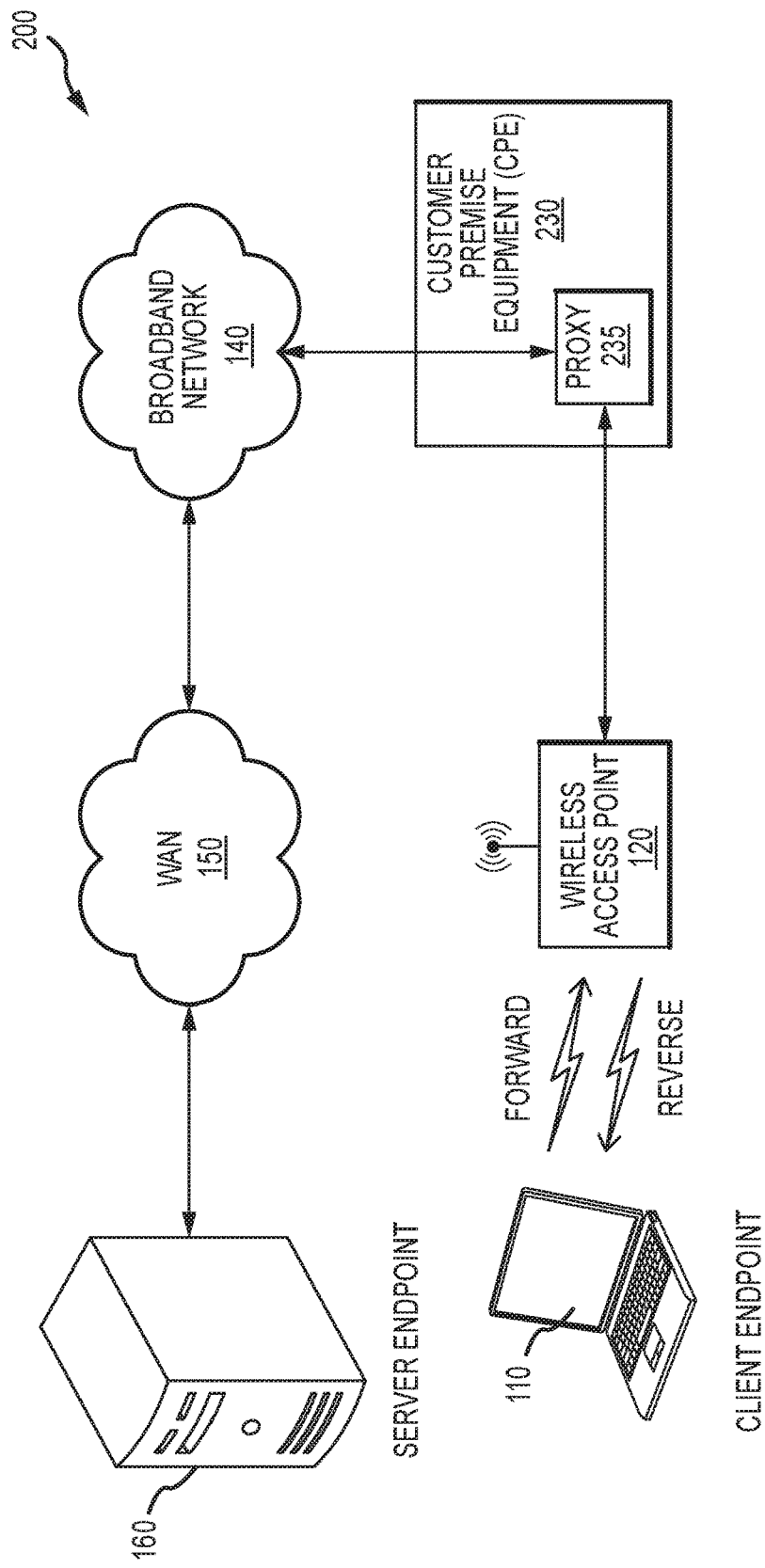
FIG. 2 illustrates an example of a high-level block diagram of a communication network architecture that supports transferring data between endpoints via transport protocol connections established according to one or more connection-oriented transport layer protocols and classifying such connections, in which the data is transferred through a proxy.

FIG. 2 illustrates an example of a high-level block diagram of a communication network architecture that supports transferring data between endpoints via transport protocol connections established according to one or more connection-oriented transport protocols and classifying such connections, in which the data is transferred through a proxy. Client endpoint 110, wireless access point 120, ISP network 140, WAN 150, and server endpoint 160 may each operate as discussed above in connection with FIG. 1. CPE 230 may operate as discussed above in connection with CPE 130 in FIG. 1. In the example illustrated in FIG. 2, CPE 230 includes a proxy 235. Proxy 235 may be a performance enhancing proxy (PEP). Examples of PEPs are described in IETF (Internet Engineering Task Force) RFC (Request for Comment) 3531, entitled "Performance Enhancing Proxies Intended to Mitigate Link-Related Degradations," which is incorporated by reference herein in its entirety, and a copy of which is included in this provisional application. Other examples of such proxies are described in U.S. Pat. Nos. 6,973,497, 7,006,480, 7,082,467, 7,219,158, 7,389,533, 7,398,552, 7,643,416, 8,140,687, 8,687,493, and 9,240,950 and U.S. Patent App. Pub. No. 2015/0381752, which are each incorporated by reference herein in their entireties. In some examples, proxy 235 may be configured to provide an application layer PEP; for example, a web caching HTTP proxy. In some examples, proxy 235 may be configured to provide a transport layer (or "Layer-4" or "transport protocol") PEP; for example, a TCP proxy. In some examples, a distributed PEP implementation may be used; for example, proxy 235 may provide a first Layer-4 proxy, and a second Layer-4 proxy may be included in ISP network 140, such that the two PEPs surround a particular link for which a performance improvement is desired, such as a satellite communication link. Proxy 235 may be configured to operate essentially transparently from the perspective of client endpoint 110, such that although it may appear to client endpoint 110 that the client endpoint 110 is communicating via an end-to-end network connection (either at a transport layer or an application layer) with remote server 160, the network connection is actually between the client endpoint 110 and proxy 235 (although proxy 235 may establish a second network connection with remote endpoint 160 and send or receive data via the second network connection in response to communications with the client endpoint 110). In some situations, such as a caching web proxy (which may be implemented in, for example, CPE 130 or a device included in ISP network 140) that already has a resource sought by client endpoint 110, a local Layer-4 connection between the client endpoint 110 and proxy 235 may not result in a corresponding remote Layer-4 connection with server endpoint 160, as the resource is available via the caching proxy. In some implementations, packet information for Layer-4 packets involved in retrieving a cached resource, or do not result in data being sent to or received from server endpoint 160, may not be used for classifying a network connection.

In some examples, proxy 235 may be configured to "spoof" Layer-4 connections, such as TCP connections. Layer-4 "Spoofing" describes a characteristic of intercepting a Layer-4 connection in the middle and terminating the connection as if the interceptor (proxy 235, for example) is the intended destination. While this is a characteristic of many TCP PEP implementations, it is not a characteristic of all TCP PEP implementations. Spoofing splits the Layer-4 connection; for example, a TCP connection between client endpoint 110 and server endpoint 160 may be split into at least two Layer-4 connections including a local Layer-4 connection between client endpoint 110 and proxy 235, and a remote Layer-4 connection to remote endpoint 160. The remote Layer-4 connection may be terminated at, for example, a network element included in ISP network 140; for example, ISP network 140 may include a PEP configured to exchange data with proxy 235. The remote Layer-4 connection may be terminated at, as another example, proxy 235. Proxy 235 may be configured to, for a spoofed TCP connection, perform local TCP acknowledgements, where TCP data segments received by proxy 235 are locally acknowledged by proxy 235, which allows fast ramp-up by client endpoint 110 for new TCP connections to maximize data throughput over a network connection with a high RTT (round trip time), and may be used to limit a maximum TCP ACK rate. Proxy 235 may be configured to, for a spoofed TCP connection, perform local retransmission, where when TCP packets got lost on the local side (which may be more likely over a wireless link between client endpoint and proxy 235 (such as a WLAN provided by wireless access point 120) due to factors such as bit errors, collisions, and link outages) proxy 235 can handle the retransmission itself rather than requiring remote server endpoint 160 to perform a retransmission. Local TCP acknowledgement and local retransmission each require additional computing and memory resources over a non-spoofed connection. For Layer-4 connections that pass through proxy 235, but are not spoofed, proxy 235 may be configured to simply perform simple forwarding of Layer-3 packets for unspoofed Layer-4 connections.

FIG. 3 illustrates an example of a high-level block diagram of a communication network architecture that supports transferring data between endpoints via transport protocol connections established according to one or more connection-oriented transport protocols and classifying such connections, in which data packets are transferred via a satellite data communications network. Client endpoint 110, WAN 150, and server endpoint 160 may each operate as discussed above in connection with FIGS. 1 and 2. CPE 330 may operate as discussed above in connection with CPE 130 in FIG. 1 and CPE 230 in FIG. 2. In FIG. 3, CPE 330 includes a VSAT (Very Small Aperture Terminal) 335 for transmitting and receiving data via orbital satellite 340. Orbital satellite 340 receives forward packets from VSAT 335 and sends the received forward packets (directly, or, in some implementations, routed through other orbital satellites) to satellite dish 355 for gateway 350. Orbital satellite 340 receives reverse packets from satellite dish 355 (directly, or, in some implementations, routed through other orbital satellites) and sends the received reverse packets to VSAT 335. In some implementations, communication equipment on aerial vehicles or platforms may be used instead of, or in addition to, orbital satellite 340. Although only one gateway 350 and satellite dish 355 are illustrated in FIG. 3, it is understood that there may be additional gateways with respective satellite dishes. Via gateway 350, one or more connections, according to a connection-oriented transport protocol, are established for transferring data between client endpoint 110 and server endpoint 160. In the example illustrated in FIG. 3, those connections are also established via WAN 150, much as discussed above. Other components of the satellite data communications network are not illustrated in FIG. 3. Additionally, although client endpoint 110 is illustrated as being connected directly to CPE 330, there may be additional network elements between client endpoint 110 and CPE 330, such as the wireless access point 120 illustrated in FIGS. 1 and 2. Client endpoint 110 may communicate with CPE 330 via wired or wireless communications.

Figure 4:
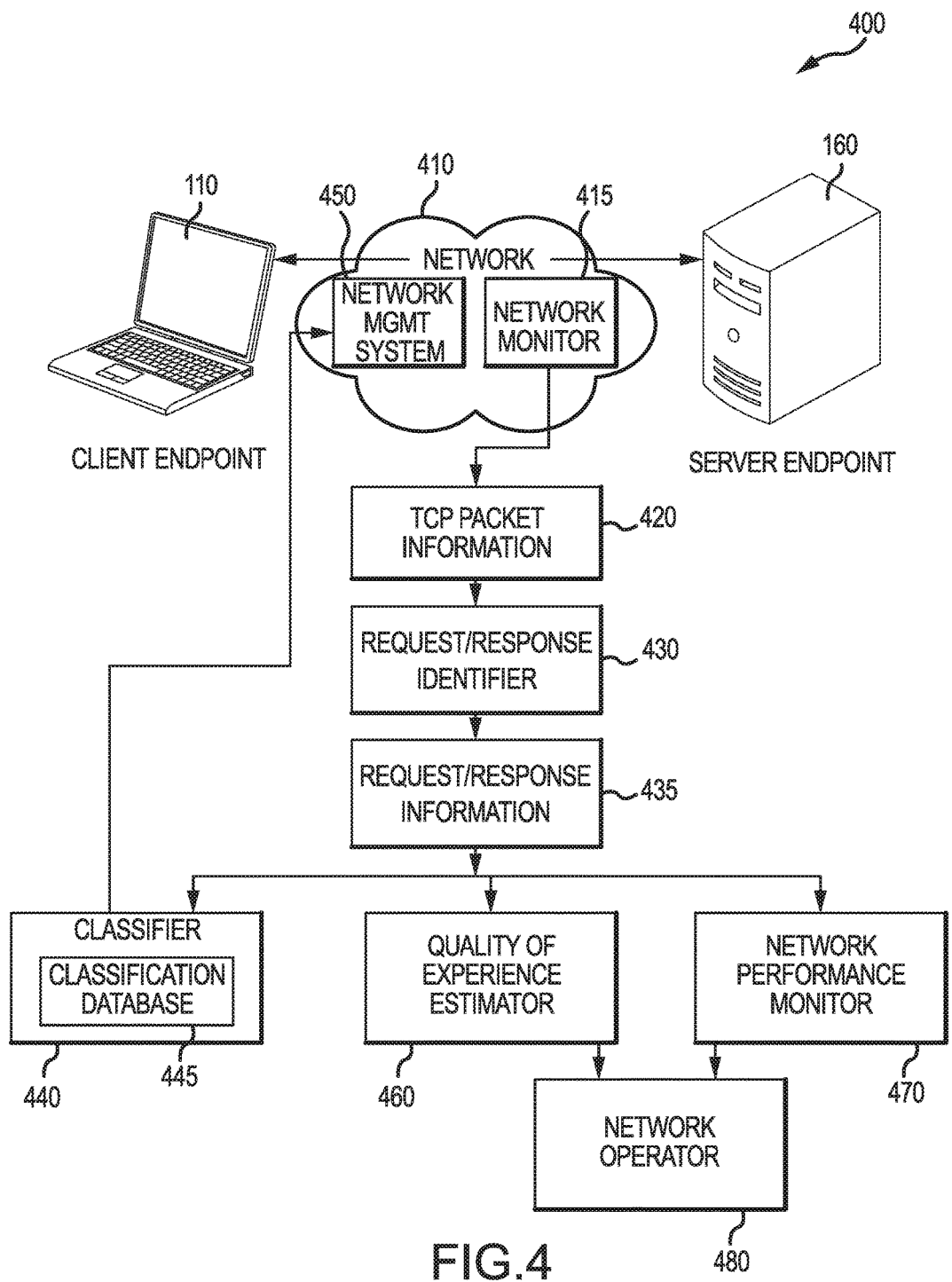
FIG. 4 illustrates an example of a communication network architecture that supports transferring data between endpoints via transport protocol connections established according to one or more connection-oriented transport layer protocols and classifying such connections.

FIG. 4 illustrates an example of a communication network architecture that supports transferring data between endpoints via transport protocol connections established according to one or more connection-oriented transport protocols and classifying such connections. Client endpoint 110 and server endpoint 160 may each operate as discussed above in connection with FIGS. 1-3. One or more transport protocol connections, according to a connection-oriented transport protocol, are established via network 410 for transferring data between client endpoint 110 and server endpoint 160; for example, client endpoint 110 may initiate and establish a TCP connection with server endpoint 160 via a TCP three-way handshake. Communication for such connections may be received, transmitted, and/or relayed by various elements of network 410; examples of such elements include, but are not limited to, wireless access point 120, CPEs 130, 230, and 330, ISP network 140, WAN 150, proxy 235, VSAT 335, orbital satellite 340, satellite dish 355, and gateway 350. Although only one server endpoint 160 illustrated in FIG. 4, it is understood that client endpoint 110 may establish transport protocol connections with other server endpoints via network 410. Although only one client endpoint 110 is illustrated in FIG. 4, it is understood that there may be additional client endpoints; for example, multiple client endpoints that perform network communications via a single CPE, and/or multiple client endpoints that perform network communications via a single ISP network or a portion of an ISP network.

Network 410 includes a network monitor 415, which may be provided by a computing system included in a network node or network element, configured to collect transport protocol state information 420 for transport protocol connections established via network 410 or a portion of network 410. Network monitor 415 may also be referred to as a "network monitoring system". Although only one network monitor 415 is illustrated in FIG. 4, it is understood that there may be additional network monitors 415 each configured to collect transport protocol state information 420 for transport protocol connections established via network 410 or portions of network 410. In an implementation including multiple network monitors 415, transport protocol state information 420 collected by the multiple network monitors 415 may be aggregated for collective storage and/or processing.

Much as discussed with respect to the example illustrated in FIG. 2, a transport protocol connection between client endpoint 110 and server endpoint 160 (which, for example, may have been initiated by client endpoint 110) may be split by a network element, such as proxy performing Layer-4 spoofing or an application layer proxy, resulting in a first transport protocol connection between the client endpoint 110 and the network element and a second transport protocol connection between the network element (or another network element, in some implementations) and the server endpoint. A first forward transport protocol packet transmitted by the client endpoint 110 via the first connection may result in a second forward transport protocol packet, different from the first forward transport protocol packet but including transport protocol payload data included in the first forward transport protocol packet, being transmitted via the second connection to server endpoint 160. A first reverse transport protocol packet transmitted by server endpoint 160 via the second connection may result a second reverse transport protocol packet, different from the first reverse transport protocol packet but including transport protocol payload data included in the first reverse transport protocol packet, on the first connection to client endpoint 110. Although there may be a one-to-one correspondence between transport protocol packets on the first connection and transport protocol packets on the second connection, in some situations there may not be such a direct correspondence. Network monitor 415 may be an endpoint of the first connection and/or an endpoint of the second connection; for example, in FIG. 2, proxy 235 or CPE 230 on which proxy 235 executes may serve as a network monitor 415 for collecting transport protocol state information 420, a proxy elsewhere within network 410 may serve as a network monitor 415 for collecting transport protocol state information 420, client endpoint 110 may serve as a network monitor 415 for collecting transport protocol state information 420, and server endpoint 160 may serve as a network monitor 415 for collecting transport protocol state information 420.

Where network monitor 415 is an endpoint of a transport protocol connection (for example, at a proxy that has split a TCP connection between client endpoint 110 and server endpoint 160), network monitor 415 may collect transport protocol state information 420 for the transport protocol connection via an internal state of a transport protocol state machine (for example, via TCP state or state machine information maintained and available from a TCP/IP network stack provided by an operating system for network monitor 415). Transport protocol state information 420 may be collected for each transport protocol connection being monitored by network monitor 415. It is noted that transport protocol state information for a transport protocol packet may also include transport protocol state information that is not necessarily tied to an individual transport protocol packet, such as SRTT, CWND, or MSS, but instead reflects a state of the transport protocol connection contemporaneous with the transfer of the transport protocol packet on the transport protocol connection. The following examples of transport protocol state information regarding the internal state of a corresponding TCP connection may be collected as TCP packets are transferred on the connection:

TIMESTAMP—Time TCP packet sent or received (as noted by TCP state machine)
SRC—Source IP and Port
DST—Destination IP and Port
DIRECTION—forward or reverse (based on, for example, source or destination IP address)
SEQNUM—Sequence number from TCP header
ACKNUM—Acknowledgement number from TCP header
PAYLOAD—Payload size/length of TCP data section. Can be calculated by subtracting the combined length of the TCP header and the encapsulating IP header from the total IP datagram length.
TCP Header Flags—SYN/FIN/RST/ACK
SRTT—Smoothed Round Trip Time Estimate (as computed by TCP state machine for Retransmission Timeout (RTO)). An estimated SRTT or RTT may be calculated
CWND—Congestion Window (updated after processing the ACK) (in Segments)
RCV_NXT—Receive next Byte count
SND_NXT—Send next Byte count
SND_UNA—Send unacknowledged Byte count
MSS—Maximum Segment Size. Typically this value does not change over the duration of a TCP connection.

In some examples, such transport protocol state information may be collected in response to receiving a TCP ACK packet. In some examples, such transport protocol state information may be collected in response to transmitting a TCP ACK packet. In some examples, such transport protocol state information may be collected for a TCP connection in response to a TCP packet being received for the TCP connection. In some examples, such transport protocol state information may be collected for a TCP connection in response to a TCP packet being transmitted for the TCP connection. In some examples, such transport protocol state information may be collected in response to a passage of time; for example, a "polling" mechanism may be used to periodically collect such statistics, such as approximately each 10 milliseconds, 20 milliseconds, 50 milliseconds, 100 milliseconds, 200 milliseconds, 600 milliseconds, 1 second, 2 seconds, 5 seconds, 10 seconds, 30 second, 1 minute, 2 minutes, 10 minutes, 15 minutes, 20 minutes, 30 minutes, 40 minutes, 45 minutes, 60 minutes, 90 minutes, and 120 minutes.

The internal state may be obtained from, for example, a proxy (such as proxy 235 in FIG. 2) or a system on which the proxy is being executed (such as CPE 230 in FIG. 2, a network element included in ISP network 140 in FIG. 1 or FIG. 2, or wireless access point 120 in FIG. 1 or FIG. 2). On a system executing a Linux-based kernel, such transport protocol state information may be, for example, obtained or derived from values included in instances of the tcp_sock data structure (defined in include/linux/tcp.h) created for each TCP connection being monitored by network monitor 415. For example, these values may be obtained via a loadable Linux kernel module, such as net/ipv4/tcp_probe.ko. On a system executing a FreeBSD-based kernel, such transport protocol state information may be, for example, obtained or derived from values included in instances of the tcp_info data structure (defined in sys/netinet/tcp.h) created for each TCP connection being monitored by network monitor 415. In some implementations, a kernel module may be used to register one or more callback functions that are called on every sent and/or received TCP ACK (or every sent and/or received TCP packet) and which obtain such kernel information for the TCP connection corresponding to the TCP ACK responsible for the callback occurring.

Although using an internal state available at an endpoint of a TCP connection, as discussed above, is convenient for collecting transport protocol state information 420, network monitor 415 does not have to be located at an endpoint of a TCP connection to collect transport protocol state information 420 for the TCP connection. In some examples, network monitor 415 may perform routing and/or forwarding of TCP packets (or, more typically, Layer-3 packets used to convey TCP packets) for which it collects transport protocol state information 420. Such monitoring may be performed at various systems through which transport protocol packets are routed. Examples of network elements that may perform such routing and/or forwarding and may embody network monitor 415 include, but are not limited to, wireless access point 120, CPEs 130, 230, and 330, network elements included in ISP network 140, network elements included in WAN 150, proxy 235, and gateway 330.

In some implementations, network monitor 415 may be configured to passively monitor transport protocol packets transferred via network 410, and collect transport protocol state information 420 based on the passively monitored packets, rather than route and/or forward monitored transport protocol packets or operate as an endpoint of a transport protocol connection. Such passive monitoring may be performed at various points in network 410. For example, network monitor 415 may be configured to monitor TCP communications on a WLAN between client endpoint 110 and a wireless access point (such as wireless access point 120 illustrated in FIGS. 1 and 2) or a CPE (such as CPEs 130, 230, and 330 illustrated in FIGS. 1-3). As another example, network monitor 415 may be configured to monitor TCP communications on a network segment between a CPE and client endpoint 110. As another example, network monitor 415 may be configured to monitor TCP communications on a network segment between a CPE and an ISP network (such as between CPE 130 and ISP network 140 in FIG. 1). As another example, network monitor 415 may be configured to monitor TCP communications on a network segment within an ISP network (such as ISP network 140 illustrated in FIGS. 1 and 2) or a network segment with a WAN (such as WAN 150 illustrated in FIGS. 1 and 2). In some examples, a network monitor 415 configured for passive monitoring may include a network adapter that is configured to operate in "monitor" or "promiscuous" mode to collect transport protocol network traffic. Software useful for collecting such information may include "network sniffer" libraries and applications, such as, but not limited to tcpdump, libpcap, and Microsoft Network Monitor.

Where network monitor 415 is not at an endpoint of a transport protocol connection, and accordingly does not collect transport protocol state information 420 via an internal state machine (for example, where network monitor 415 uses passive monitoring or network monitor 415 performs routing and/or forwarding of transport protocol packets), although much of the types of transport protocol state information discussed above may be collected based on transport protocol header values, the network monitor 415 generally will not have access to internal state information maintained by an endpoint of a transport protocol connection. For example, CWND is internal to a TCP implementation, and is not transmitted across the network. SRTT is another example of a type of transport protocol state information not transmitted across the network. There are various techniques to estimate CWND using passive network monitoring. U.S. Pat. No. 8,724,475, entitled "Method and Apparatus to Estimate the Sender's Congestion Window Throughout the Life of a TCP Flow (Socket Connection)," which is incorporated by reference herein in its entirety, describes such techniques. S. Jaiswal, G. Iannaccone, C. Diot, J. Kurose, D. Towsley, "Inferring TCP connection characteristics through passive measurements," in IEEE INFOCOM 2004, Vol. 3, pp. 1582-1592 (DOI 10.1109/INFCOM.2004.1354571), which is incorporated by reference herein in its entirety, discusses techniques involving tracking network packet exchanges to estimate which "flavor" of TCP (for example, Tahoe, Reno, or NewReno) best matches the exchange by creating "replica" models of the TCP sender's state for each flavor, and determining approximated values for CWND and RTT based on the closest model. U.S. Pat. No. 7,636,321, entitled "Method and System for Measuring Round-Trip Time of Packets in a Communications Network," which is incorporated by reference herein in its entirety, describes additional techniques for estimating RTT or SRTT. Accordingly, values may be estimated for certain types of transport protocol state information.

Transport protocol state information 420 collected by network monitor 415 (or multiple network monitors 415, depending on the implementation) may be provided directly to request/response identifier 430. For example, each time transport protocol state information is collected for a TCP packet (for example, as each TCP packet arrives at network monitor 415), the collected transport protocol state information may be provided to request/response identifier 430 for processing; this allows for realtime processing by request/response identifier 430 and, in some implementations, realtime processing and response by other systems such as, but not limited to, classifier 440 and network management system 450. In some implementations, transport protocol state information collected by network monitor 415 may be stored, at network monitor 415 or at another system included in network 410, for archiving and/or later processing by request/response identifier 430. Transport protocol state information 420 collected by multiple network monitors 415 may be aggregated for processing and/or storage at a common system. A single network monitor 415 may be configured to capture transport protocol state information both as an endpoint of some connections (for example, connections spoofed by a PEP TCP proxy executing on the network monitor) and by passively monitoring other transport protocol connections (for example, TCP connections that have not been spoofed by the proxy).

Request/response identifier 430, which may be provided by a computing system, configured to identify a beginning and an end for each of one or more request/response periods, and generate request/response information 435 (which may also be referred to as "application-later metrics") for the identified request/response periods, based on transport protocol state information 420 received for a transport protocol connection. Request/response identifier 430 may also be referred to as a "request/response identification system". Request/response identifier 430 may receive transport protocol state information 420 collected for multiple transport protocol connections, and generate request/response information 435 for each transport protocol connection. Many application level protocols involve request/response exchanges, where via a transport protocol connection a first endpoint (such as client endpoint 110) transmits a request message (for example, an HTTP GET request message) to a second endpoint (such as server endpoint 160), and, in response to the request message, the second endpoint transmits a response message (such as an HTTP response providing a resource requested in the request message). In some circumstances, a request/response period may correspond to a single request message, which may be sent via one or more data-bearing transport protocol packets (each having a non-zero payload size), and a single response message, which also may be sent via one or more data-bearing transport protocol packets, as illustrated by request/response periods 560 and 570 in FIG. 5. However, in circumstances where request multiplexing is performed a request/response period may correspond to multiple, and often overlapping, exchanges of request messages and corresponding response messages between client endpoint 110 and server endpoint 160, as illustrated by request/response period 690 in FIG. 6. In some implementations and/or circumstances, a request/response period identified by a request/response identifier 430 may correspond to a portion of a media stream, such as VOIP (Voice Over IP) audiovisual data transmitted by an endpoint, and not include a request-response pair; request/response information for such request/response periods may reflect this (such as a flag identifying a request/response period as being associated with such a data flow). Request/response identifier 430 may be implemented by various systems. In some implementations, request/response identifier 430 may be provided by the same computing system that provides network monitor 415; for example, CPEs 130, 230, and 330 in FIGS. 1-3 may each execute program instructions implementing both a network monitor 415 for collecting transport protocol state information 420 and a request/response identifier 430 for identifying request/response periods based on the collected transport protocol state information 420.

Below are two example algorithms, Algorithms 1 and 2, which each illustrate techniques for identifying beginnings and endings of request/response periods during a TCP connection and generating request/response information 435 for the identified request/response periods. Algorithm 1 provides an example tailored to generating request/response information 435 based on transport protocol state information 420 that was captured by a network monitor 415 that collects transport protocol state information based on TCP header values rather than internal state machine information; for example, this might be used for transport protocol state information collected by a network monitor 415 that uses passive monitoring of transport protocol packets and/or a network monitor 415 that is not located at an endpoint of a transport protocol connection (although Algorithm 1 could be used where a network monitor 415 is located at an endpoint, but does not use internal state machine information to collect transport protocol state information).

Algorithm 1: Identifying Request/Response Periods from TCP Header-Derived
Transport Protocol State Information

```
Function getAppMetrics(tcpHdrs,4tuple)
{
// This function uses TCP state information based on TCP headers for packets for
// a TCP connection used to transfer data (generally in the form of requests and
// responses) between a client endpoint and a server endpoint. Outputs
// information for request/response periods identified for the TCP connection
// Initialize variables
count=0;
Rrt=NULL;    // Data structure which will store request/response information
             // Each column corresponds to a metric, and each row corresponds
             // to an identified request/response period
// Initialize flags
isIdle=FALSE; // Out of request-response cycle
inFlight=FALSE; // Response packets inflight/ not yet acknowledged by the client
isKeepAlive=FALSE; // Current packet is Keep-alive
for (Each pkt of the connection) {
   count=count+1;
   if ( pkt.flag == SYN ) {
   //SYN (typically client-initiated connections)
   // Can modify above conditional to check to determine packet direction, in case
   // the connection was initiated by the server (can modify to handle such
   // connections as well)
      t_StartConn=pkt.timestamp; //Start of connection
   } else if (pkt.flag == SYN-ACK) {
   //SYN-ACK (typically) from remote server to client since client-initiated
   //connections
   // Can modify above conditional check to ensure packet direction
      // Sequence numbers (Bytes)
      init_nxt=pkt.seqNum;
      init_rcvnxt=pkt.ackNum;
      cur_rcvnxt=init_rcvnxt;
      next_rcvnxt=cur_rcvnxt;
      cur_nxt=init_nxt;
      cur_una=cur_nxt;
      t_StartReq=pkt.timestamp; // Start of Request
      // Packet or event counters within a request-response cycle
      numReq=0;
      numResp=0;
      numFrag=0;
      numMultiplexedReq=0;
      numKA=0;
   } else if (pkt.flag ==FIN | | pkt.flag == RST | | connectionTerminated( )) {
   // FIN or RST packet or before closing the connection
   // Dump summary
      if (inFlight) {    // approximating finish time for the abrupt capture, in case
                         // t_EndResp was not updated
         t_EndResp=pkt.timestamp; // End of Response
         inFlight=FALSE;
      }
      // will treat this as end of request/response period
      // collect the information for the request/response period in a vector
      cur_Rrt=vector(4tuple, count, t_StartReq-t_StartConn,
              t_StartResp-t_StartConn, t_EndResp-t_StartConn,
              next_rcvnxt-init_rcvnxt, cur_nxt-init_nxt, numReq, numFrag,
              numMultiplexedReq, numResp, numKA);
      // Append the information for the request/response period to the existing
      // rows of data for all the request/response periods during the
      // TCP connection so far
      Rrt=appendRows(Rrt,cur_Rrt);
      return(Rrt);
   } else if (pkt.srcIP == clientIP) {
   // Pkt/ ACK from client to CPE
      cur_una=pkt.ackNum;
      if (cur_nxt!=NULL && cur_una==cur_nxt && inFlight) {
      // Time when in_flight=0 for response
         t_EndResp=pkt.timestamp; // Can be updated by another packet later
         inFlight=FALSE;
      }
      seqNum1=pkt.seqNum; // Starting sequence number
      seqNum2=pkt.seqNum + pkt.payload; // Ending sequence number
      if (seqNum1 == next_rcvnxt-1 && pkt.payload <2) { #Keep-alive packet
         isKeepAlive=TRUE;
         numKA=numKA+1;
      } else if (pkt.payload>0 && seqNum2 > next_rcvnxt ) {
         # Pkt with payload / request
         isKeepAlive=FALSE;
         cur_rcvnxt=seqNum1;
         next_rcvnxt=seqNum2;
```

Algorithm 1: Identifying Request/Response Periods from TCP Header-Derived
Transport Protocol State Information

```
        if (!isIdle) { // Start of a new request
            isIdle=TRUE;
            init_rcvnxt=seqNum1;
            init_nxt=cur_una;
            cur_nxt=cur_una;
            t_StartReq=pkt.timestamp;
            numReq=0;
            numResp=0;
            numMultiplexedReq=0;
            numKA=0;
            numFrag=0;
        } else if (cur_nxt==cur_una && cur_nxt > init_nxt &&
                !isKeepAlive && ((seqNum2-seqNum1) > threshRequestSize))) {
        // Start of new request & end of previous response
        // end of request/response period
        // collect the information for the request/response period
        cur_Rrt=vector(4tuple, count, t_StartReq-t_StartConn,
                    t_StartResp-t_StartConn, t_EndResp-t_StartConn,
                    cur_rcvnxt-init_rcvnxt, cur_nxt-init_nxt, numReq,
                    numFrag, numMultiplexedReq, numResp, numKA);
        // and append it to the existing rows for the connection
        Rrt=appendRows(Rrt,cur_Rrt);
        // Initialize variables for the new request
        t_StartReq=pkt.timestamp;
        init_rcvnxt=cur_rcvnxt;
        init_nxt=cur_nxt;
        numReq=0;
        numResp=0;
        numMultiplexedReq=0;
        numKA=0;
        numFrag=0;
        } else if (cur_nxt!=cur_una) { // Multiplexed request
            numMultiplexedReq = numMultiplexedReq + 1;
        }
        // Increment the request and fragment count for the current packet
        numReq= numReq+1;
        if ( seqNum2-seqNum1 < MSS && !isKeepAlive && cur_nxt>init_nxt ) {
            numFrag=numFrag+1;
        }
    }
    } else if (pkt.dstIP == localIP) {
    // Packet from server endpoint to client endpoint
        if (pkt.payload>0) {// Pkt with payload / response
            inFlight=TRUE;
            isKeepAlive=FALSE;
            seqNum=pkt.seqNum + pkt.payload; // Sequence number of data send
            if (cur_nxt!=NULL && seqNum>cur_nxt) { // Only new transmissions
                numResp=numResp+1;
                cur_nxt=seqNum;
                if (numResp==1) { //Start of response
                    t_StartResp=pkt.timestamp;
                }
            }
        }
    } // End of packet to the client endpoint
} //End for each packet
}
```

Algorithm 2 provides an example tailored to generating request/response information 435 based on transport protocol state information 420 that was captured by a network monitor 415 that collects transport protocol state information based on internal state machine information; for example, this might be used by a network monitor 415 located at an endpoint of a transport protocol connection, such as a TCP connection between client endpoint 110 and proxy 235 in FIG. 2.

Algorithm 2: Identifying Request/Response Periods from TCP State Machine-Derived
Transport Protocol State Information

```
Function getAppMetrics(tcpStateMachineStats,4tuple)
{
// This function uses TCP state information based on TCP state machine statistics
// for a TCP connection after each packet (or in this example, it may be after
// each packet from a client endpoint) received by a TCP proxy, where the TCP
```

Algorithm 2: Identifying Request/Response Periods from TCP State Machine-Derived Transport Protocol State Information

```
// connection is used to transfer data (generally in the form of requests and
// responses) between the client endpoint and a server endpoint. Outputs
// information for request/response periods identified for the TCP connection
// Initialize variables
Rrt=NULL;     // Data structure which will store request/response information
              // Each column corresponds to a metric, and each row corresponds
              // to an identified request/response period
inReqRespCycle=FALSE;
isLastAck=FALSE;
isLastAcknNewGet=FALSE;
isNewGet=FALSE;
isKeepAlive=FALSE;
cur_t=Timestamp;
t_StartConn=cur_t;
cur_nxt=−1;
cur_una=−1;
cur_cwnd=−1;
cur_srtt=−1;
init_nxt=−1;
cur_pktlen=0;
numKA=0;
for (each packet from the client for the connection identified by 4tuple){
    count=count+1;
    // Retain old variables
    old_t=cur_t;
    old_nxt=cur_nxt;
    old_una=cur_una;
    old_cwnd=cur_ownd;
    old_srtt=cur_srtt;
    old_pktlen=cur_pktlen;
    // Update current variables using the TCP state machine variables
    cur_t=Timestamp;
    cur_nxt=SND.NXT;
    cur_una=SND.UNA;
    cur_cwnd=CWND;
    cur_srtt=SRTT;
    cur_pktlen=RCV.PKTLEN;
    // Calculate inter-arrival time for packets received from client side
    cur_IA=cur_t-old_t;
    isKeepAlive = (cur_IA>threshKeepAlive && cur_pktlen==threshKeepAliveLen && cur_nxt==cur_una);
    // Conditions to identify if the last received packet was end of response
    // Condition 1 - if last received packet implied zero inflight packets (sent
from proxy to client)
    isLastAck_c1 = ((old_nxt==old_una || old_nxt==cur_una) && (cur_pktlen > threshGETLen));
    // Or Condition 2 - if CWND was not reduced despite packet inter-arrival
higher than RTT TimeOut, indicating sender had no inflight packets
    isLastAck_c2 =60 ((cur_IA > 3*old_srtt) && (cur_ownd >= old_cwnd) &&
(cur_pktlen > threshGETLen ));
    // And, in addition, this is not a continuation of packets of the current
request or is a keep alive packet
    isLastAck = (isLastAck_c1 || isLastAck_c2) &&
        (cur_nxt>init_nxt || isKeepAlive);
    // Conditions to identify if the current packet is start of a new request
    isNewGet= !inReqRespCycle && !isKeepAlive && (cur_pktlen>threshGETLen);
    // Conditions to identify if the current packet is both the end of
    // previous response and start of a new request
    isLastAcknNewGet = cur_pktlen>threshGETLen &&
        (old_nxt==old_una || old_nxt==cur_una) && cur_nxt>init_nxt;
    isLastSample=connectionTerminated( ); // Flag if connection is closed
    if ((isLastSample || isLastAck) && inReqRespCycle) {
        inReqRespCycle=FALSE;
        respSize=cur_nxt - init_nxt;
        if(t_StartResp==−1) {   // In case the LastAck is the only ACK for
                                // current request hence t_StartResp has not
                                // been updated elsewhere
            t_StartResp =cur_t;
        }
        if (t_EndResp == −1) { // If not updated yet
            t_EndResp=old_t;
        }
        // Compute the application-layer metrics for the last object exchange
        // and store it as a vector
        cur_Rrt=vector(4tuple, count, t_StartReq-t_StartConn,
            t_StartResp-t_StartConn, t_EndResp-t_StartConn,
```

Algorithm 2: Identifying Request/Response Periods from TCP State Machine-Derived Transport Protocol State Information

```
            reqSize, respSize, numReq, numFrag, numMultiplexedReq,
            ceil(respSize/MSS), numKA);
        // Append the current row of metrics (for current request-response
cycle) to the existing rows of data for all the objects exchanged so far
        Rrt=appendRows(Rrt,cur_Rrt);
        init_nxt=cur_nxt;
        t_StartReq=cur_t;
    } else if (isKeepAlive) {
        numKA=numKA+1;
        if (t_EndResp == -1) {// Only update the end of response once after
the first Keep Alive, ignore subsequent Keep-Alives
            t_EndResp=old_t;
        }
    }
    if (isNewGet || isLastAcknNewGet) {    // Initialize parameters for the current
                                           // request-response cycle
        inRegRespCycle=TRUE;
        init_nxt=cur_nxt;
        t_StartReq=cur_t;
        t_StartResp=-1;
        t_EndResp=-1;
        reqSize=RCV.PKTLEN-threshPureACK; // Subtract TCP header length
        numReq=1;
        numFrag=0;
        numKA=0;
    } else {
        if(t_StartResp== -1 && cur_nxt>init_nxt) { //Start of response
            t_StartResp = cur_t;
        }
        // Update Request size using packet length
        reqSize = reqSize + (our_pktlen-threshPureACK);
        if (cur_pktlen>threshGETLen) {
            numReq = numReq + 1;
            if (t_StartResp>-1){ // In middle of an incomplete response
                numMultiplexedReq = numMultiplexedReq + 1;
            }
        }
        if(cur_pktlen<MSS && cur_pktlen>threshACK){
            numFrag=numFrag + 1;
        }
    }
}
}
```

A number of changes might be made to the simplified examples illustrated in Algorithms 1 and 2. As a first example, although the example Algorithms 1 and 2 only identify non-overlapping request/response periods (noting that in some circumstances in which request multiplexing occurs, a single request/response period may be identified for multiple concurrent or overlapping request-response message pairs, with numFrags and numMultiplexedReq reflecting a number of requests for the request/response period) for a single TCP connection, in other implementations overlapping request/response periods may be identified by request/response identifier 430; for example, in some circumstances request/response identifier 430 may be able to distinguish discrete request and response message pairs, and identify request/response periods for each such message pair, when a client performs request multiplexing. As a second example, although Algorithms 1 and 2 assume each TCP packet is for the same TCP connection, it is understood that these algorithms can be readily modified to distinguish TCP packets for different TCP connections (for example, by distinguishing TCP connections based on 4-tuples of source IP address, source port, destination IP address, and destination port) and maintain separate state information for each TCP connection for which request/response identifier 430 has received TCP state information; for example, a wrapper function may call the getAppMetrics( ) functions in Algorithm 1 and/or Algorithm 2 separately for each identified TCP connection. As a third example, although Algorithms 1 and 2 assume that every request/response period begins with a request transmitted by client endpoint 110, it is understood that this can be readily modified to identify request/response periods beginning with a request transmitted by server endpoint 160. As a fourth example, although Algorithm 2 assumes the provided transport protocol state information was collected for TCP packets on a local TCP connection between client endpoint 110 and a TCP proxy (for example, a PEP TCP proxy as discussed in connection with FIG. 2), Algorithm 2 can be readily modified to instead process transport protocol state information collected for TCP packets on a remote TCP connection.

As discussed above and illustrated in Algorithms 1 and 2, request/response identifier 430 identifies request/response periods and determines request/response information 435 for each identified request/response period. Examples of the request/response information 435 include, but are not limited to:

Connection ID—A unique identifier for the transport protocol connection for the request/response period. This may include, for example, a source IP address, a source port, a destination IP address, and destination port.

Serial Number—A unique identifier for the request/response period. This value may be unique for a transport protocol connection, or may be unique across other transport protocol connections as well. A simplified serial number is shown in Algorithms 1 and 2 based on a number of TCP packets received on the transport protocol connection.

Request Start Time—The time for the beginning of the request/response period. In some examples, the time may be relative to the start of the transport protocol connection.

Response Start Time—The time that a first transport protocol packet for a response was observed for the request/response period. In some examples, the time may be relative to the start of the transport protocol connection.

Response End Time—The time for the end of the request/response period. In some examples, the time may be relative to the start of the transport protocol connection.

Request Size—The total number of transport protocol data payload bytes in request packets.

Response Size—The total number of transport protocol data payload bytes in response packets.

Number of Request Packets—The number of transport protocol request packets received on the transport protocol connection for the request/response period.

Number of Request Fragments—The number of transport protocol request fragments received on the transport protocol connection for the request/response period.

Number of Multiplexed Requests—In Algorithms 1 and 2, no attempt is made to identify request-response pairs for multiplexed requests. A number of multiplexed requests is estimated based a number of transport protocol fragments in request packets and their relative order with the response packets.

Number of Response Packets—The number of transport protocol response packets received on the transport protocol connection for the request/response period. This may be estimated based on the MSS for a TCP connection.

Number of Keep Alives—The number of TCP keepalive packets observed during the request/response period.

In Algorithms 1 and 2, the above request/response information values are stored in rows in the array variable Rrt, with one row for each identified request/response period.

In addition to the transport protocol state information 420 received as an input and request/response information 435 generated as an output, Algorithms 1 and 2 make use of a number of internal state variables, including, but not limited to:

t_StartConn—Start time of the TCP connection.
t_StartReq—Start time of first request TCP packet.
t_StartResp—Start time of first response TCP packet.
t_EndResp—Estimated end time for request/response period.
init_nxt—Initial sequence number from reverse direction (for example, based on TCP state information for a TCP packet sent to client endpoint 110). May be based on the SND_NXT internal state value discussed above.
init_rcvnxt—Initial sequence number from forward direction (for example, based on TCP state information for a TCP packet sent by client endpoint 110). May be based on the RCV_NXT internal state value discussed above.
cur_nxt—Highest sequence number from reverse direction. May be based on a current or updated value of the SND_NXT internal state value discussed above.
cur_una—Unacknowledged sequence number at network monitor 415, based on received forward TCP ACK packets. May be based on a current or updated value of the SND_UNA internal state value discussed above.
cur_rcvnxt—Next expected sequence number in forward direction (for example, from client endpoint 110). May be based on a current (before updating) value of the RCV_NXT internal state value discussed above.

Figure 5:
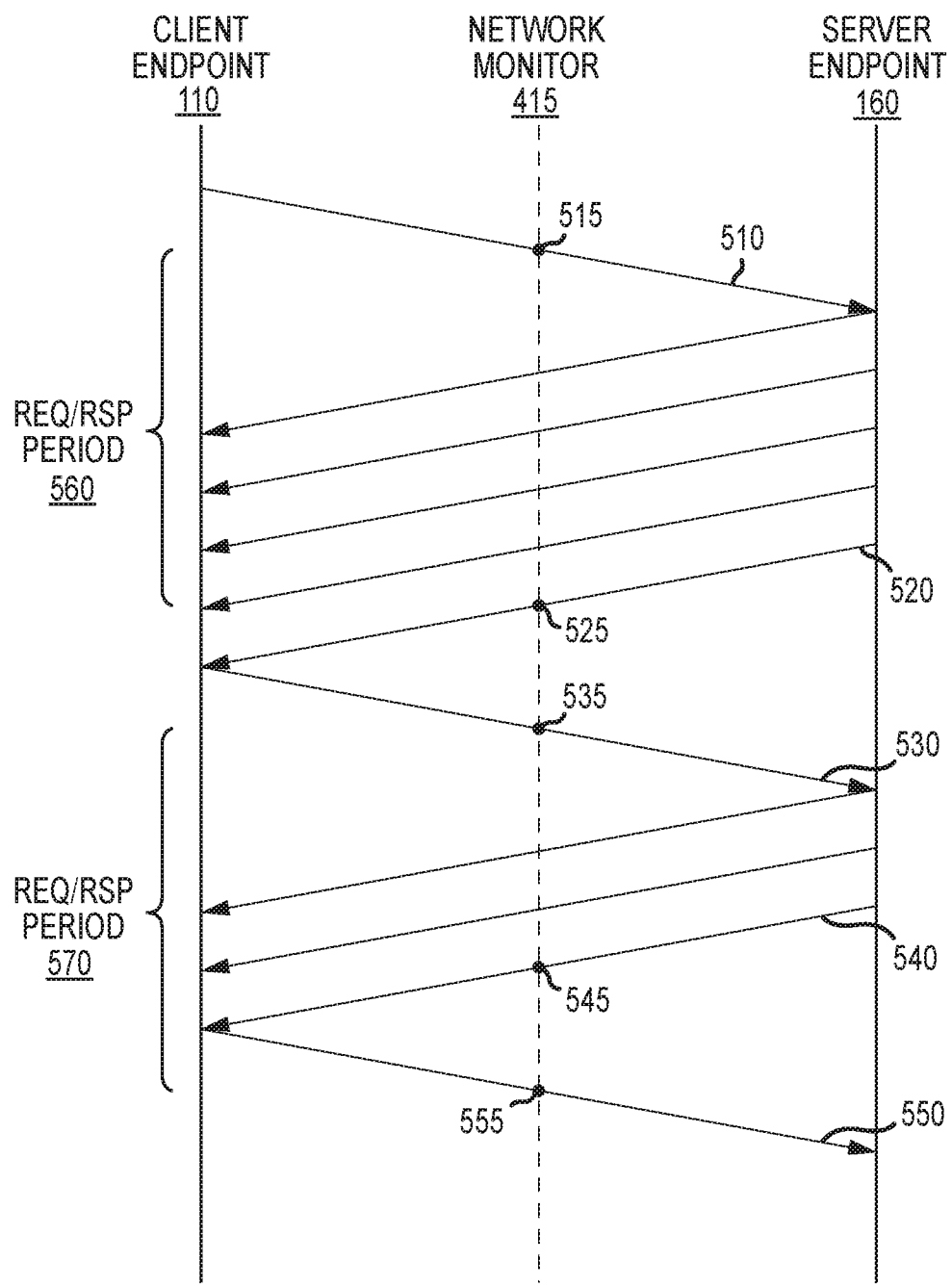
FIG. 5 illustrates an example in which the network monitor illustrated in FIG. 4 collects transport protocol state information for a transport protocol connection between the client endpoint and the server endpoint illustrated in FIG. 4.

FIG. 5 illustrates an example in which the network monitor 415 illustrated in FIG. 4 collects transport protocol state information for a transport protocol connection between the client endpoint 110 and the server endpoint 160 illustrated in FIG. 4. Additionally, FIG. 5 illustrates examples of request/response periods 560 and 570 that might be identified by the request/response identifier 430 illustrated in FIG. 4. Client endpoint 110 transmits forward TCP packet 510 to server endpoint 160. For example, client endpoint 110 may issue a first HTTP GET request to obtain a first resource from server endpoint 160. At 515, network monitor 415 collects transport protocol state information for forward TCP packet 510. In this particular example, server endpoint 160 responds to forward TCP packet 510 by transmitting five reverse TCP packets to client endpoint 110, with reverse TCP packet 520 being the last of the five reverse TCP packets transmitted for the response. For example, server endpoint 160 may be responding to the first HTTP GET request with an HTTP response providing the requested first resource and having a data size of 6200 bytes, which is divided according to the TCP MSS (around 1460 bytes) into the five reverse TCP packets ending with reverse TCP packet 520. Network monitor 415 collects transport protocol state information for each of these five reverse TCP packets, including collecting transport protocol state information for reverse TCP packet 520 at 525.

Client endpoint 110 transmits forward TCP packet 530 to server endpoint 160. For example, client endpoint 110 may issue a second HTTP GET request to obtain a second resource from server endpoint 160. At 535, network monitor 415 collects transport protocol state information for forward TCP packet 510. In processing of the transport protocol state information collected for this TCP connection, the transport protocol state information collected at 515 for forward TCP packet 510 may be used to identify a beginning of a first request/response period 560, the transport protocol state information collected at 535 for forward TCP packet 530 (in view of other transport protocol state information, such as the transport protocol state information collected at 525 for reverse TCP packet 520) may be used to identify a beginning of a second request/response period 570, and/or the transport protocol state information collected at 535 for forward TCP packet 530 (in view of other transport protocol state information, such as the transport protocol state information collected at 525 for reverse TCP packet 520) may be used to identify an end of the first request/response period 560 (with a beginning of the first request/response period 560 corresponding to forward TCP packet 510). Examples of such processing of transport protocol state information for identifying beginnings and ends of request/response periods and generating corresponding request/response information are illustrated below, such as in example Algorithms 1 and 2.

In this particular example, server endpoint 160 responds to forward TCP packet 530 by transmitting three reverse TCP packets to client endpoint 110, with reverse TCP packet 540 being the last of the three reverse TCP packets transmitted for the response. For example, server endpoint 160 may be responding to the second HTTP GET request with an HTTP response providing the requested second resource and having a data size of 4000 bytes, which is divided according to the TCP MSS into the three reverse TCP packets ending with reverse TCP packet 540. Network monitor 415 collects transport protocol state information for each of these three reverse TCP packets, including collecting transport protocol state information for reverse TCP packet 540 at 545.

Client endpoint 110 transmits forward TCP packet 550 to server endpoint 160. In a first example, forward TCP packet 550 may have ACK set (to acknowledge reverse TCP packet 540) and include a TCP data payload; for example, forward TCP packet 550 may be for a third HTTP GET request to obtain a third resource from server endpoint 160. In this first example, in processing of the transport protocol state information collected for this TCP connection, the transport protocol state information collected at 555 for forward TCP packet 550 (in view of other transport protocol state information, such as the transport protocol state information collected at 545 for reverse TCP packet 540) may be used to identify a beginning of a third request/response period (not illustrated in FIG. 5), and/or the transport protocol state information collected at 555 for forward TCP packet 550 (in view of other transport protocol state information, such as the transport protocol state information collected at 545 for reverse TCP packet 540) may be used to identify an end of the second request/response period 570. In a second example, forward TCP packet 550 may be a TCP FIN packet, indicating client endpoint 110 has ended the TCP connection. In this second example, in processing of the transport protocol state information collected for this TCP connection, the transport protocol state information collected at 555 for forward TCP packet 550 (in view of other transport protocol state information, such as the transport protocol state information collected at 545 for reverse TCP packet 540) may be used to identify an end of the second request/response period 570. Examples of such processing of transport protocol state information for identifying beginnings and ends of request/response periods and generating corresponding request/response information are illustrated below, such as in example Algorithms 1 and 2.

Figure 6:
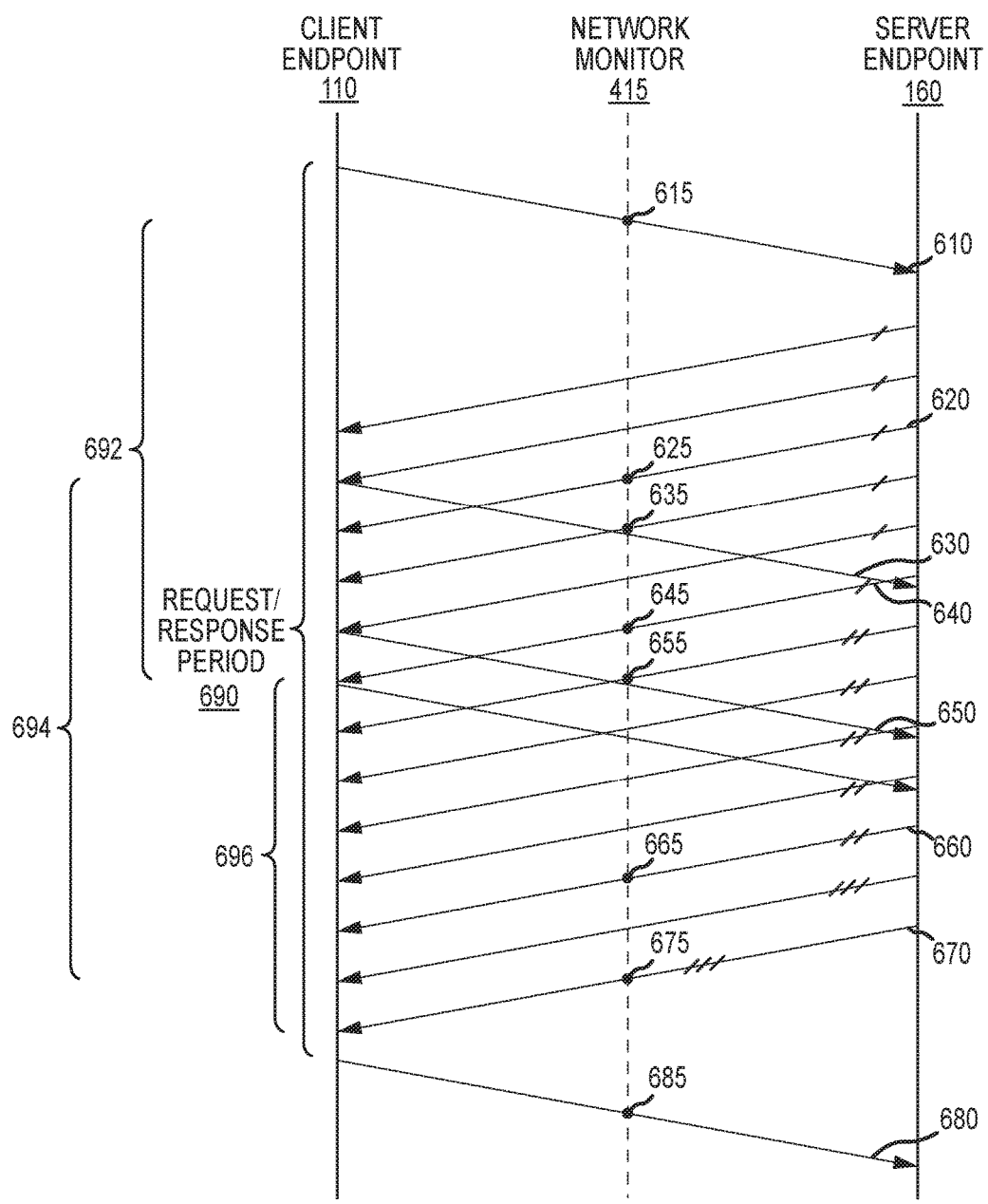
FIG. 6 illustrates an example in which the network monitor illustrated in FIG. 4 collects transport protocol state information for a transport protocol connection between the client endpoint and the server endpoint illustrated in FIG. 4, where the client endpoint performs multiplexing of requests to the server endpoint.

FIG. 6 illustrates an example in which the network monitor 415 illustrated in FIG. 4 collects transport protocol state information for a transport protocol connection between the client endpoint 110 and the server endpoint 160 illustrated in FIG. 4, where the client endpoint 110 performs multiplexing of requests to the server endpoint 160. Additionally, FIG. 6 illustrates an example of a request/response period 690 that might be identified by the request/response identifier 430 illustrated in FIG. 4. In this disclosure, terms such as "request multiplexing" or "multiplexing of requests" refers to when, on a single transport protocol connection, a first endpoint (such as client endpoint 110) begins to transmit a request message to a second endpoint (such as server endpoint 160) before the first endpoint has fully received a response to a request message previously transmitted to the second endpoint. These terms may be applied to, for example, use of HTTP/1.1 pipelining of client requests and use of HTTP/2 multiplexing (in which, for example, a single TCP connection may be used for asynchronous exchanges of request and response messages).

In some circumstances, such as with request multiplexing using HTTP/2, a single transport protocol packet may include multiple application level requests. In circumstances where request multiplexing is used, particularly if messages are encrypted (such as by use of TLS (Transport Layer Security) or SSL (Secure Sockets Layer)), it can be difficult to identify the beginnings and ends of individual request-response message pairs. Additionally, in some circumstances, such as under the HTTP/2 protocol, a single transport protocol packet may include data for multiple application level responses, responses may be sent in a different order than their respective requests, and/or transmission of response data may be interleaved such that a portion of a first response may be transmitted after a beginning portion of a second response has been transmitted but before an end portion of the second response has been transmitted. In circumstances where such response transmission techniques are used, particularly if messages are encrypted, it can be difficult to identify the beginnings and ends of individual request-response message pairs. Thus, as illustrated in examples below, a single request/response period may relate to multiple request-response exchanges across a network connection.

Client endpoint 110 transmits forward TCP packet 610 to server endpoint 160. For example, client endpoint 110 may issue a first request to obtain a first resource from server endpoint 160. At 615, network monitor 415 collects transport protocol state information for forward TCP packet 610. In this particular example, server endpoint 160 responds to forward TCP packet 610 by transmitting six reverse TCP packets to client endpoint 110, including reverse TCP packets 620 and 640 (with reverse TCP packet 640 being the last of the six reverse TCP packets transmitted for the response). For example, server endpoint 160 may be responding to the first request with a response providing the requested first resource and having a data size of 7800 bytes, which is divided according to the TCP MSS into the six reverse TCP packets including reverse TCP packets 620 and 640. Network monitor 415 collects transport protocol state information for each of these seven reverse TCP packets, including collecting transport protocol state information for reverse TCP packet 620 at 625 and reverse TCP packet 640 at 645.

Before receiving all six of the reverse TCP packets for the application level response to forward TCP packet 610, client endpoint 110 transmits forward TCP packet 630 to server endpoint 160, accordingly making use of request multiplexing. For example, client endpoint 110 may issue a second request to obtain a second resource from server endpoint 160. At 635, network monitor 415 collects transport protocol state information for forward TCP packet 630. However, in contrast to the exchange of TCP packets and the transport protocol state information collected at 535 for forward TCP packet 530 in the example illustrated in FIG. 5, the TCP state information collected at 635 for forward TCP packet reflects that forward TCP packet 630 does not acknowledge at least reverse TCP packet 620. For exchange of TCP packets illustrated in FIG. 6, network monitor 415 does not receive a forward TCP packet that acknowledges all reverse TCP packets already received by network monitor 415 until forward TCP packet 680.

Before receiving all six of the reverse TCP packets for the application level response to forward TCP packet 610, and before receiving any reverse TCP packets for an application level response to forward TCP packet 630, client endpoint 110 begins transmitting two forward TCP packets (due to a third request included therein being larger than the TCP MSS), including forward TCP packet 650, to server endpoint 160. For example, client endpoint 110 may issue the third request to obtain a third resource from server endpoint 160. Network monitor 415 collects transport protocol state information for both of these forward TCP packets, including collecting transport protocol state information for forward TCP packet at 650.

In this particular example, after transmitting reverse TCP packet 640, server endpoint 160 responds to forward TCP packet 630 by transmitting five reverse TCP packets to client endpoint 110, with reverse TCP packet 660 being the last of the five reverse TCP packets transmitted for the response. Network monitor 415 collects transport protocol state information for each of these five reverse TCP packets, including collecting transport protocol state information for reverse TCP packet 660 at 665. After transmitting reverse TCP packet 660, server endpoint 160 responds to the request included in forward TCP packet 650 by transmitting two reverse TCP packets to client endpoint 110, with reverse TCP packet 670 being the last of the two reverse TCP packets transmitted for the response. Network monitor 415 collects transport protocol state information for both of these reverse TCP packets, including collecting transport protocol state information for reverse TCP packet 670 at 675.

Client endpoint 110 transmits forward TCP packet 680 to server endpoint 160. In a first example, forward TCP packet 680 may have ACK set (to acknowledge reverse TCP packet 670) and include a TCP data payload; for example, forward TCP packet 680 may be for a fourth request to obtain a fourth resource from server endpoint 160. In this first example, in processing of the transport protocol state information collected for this TCP connection, the transport protocol state information collected at 685 for forward TCP packet 680 (in view of other transport protocol state information, such as the transport protocol state information collected at 675 for reverse TCP packet 670) may be used to identify a beginning of a second request/response period (not illustrated in FIG. 6), and/or the transport protocol state information collected at 685 for forward TCP packet 680 (in view of other transport protocol state information, such as the transport protocol state information collected at 675 for reverse TCP packet 670) may be used to identify an end of the first request/response period 690 (with a beginning of the first request/response period 690 corresponding to forward TCP packet 610). In a second example, forward TCP packet 680 may be a TCP FIN packet, indicating client endpoint 110 has ended the TCP connection. In this second example, in processing of the transport protocol state information collected for this TCP connection, the transport protocol state information collected at 685 for forward TCP packet 680 (in view of other transport protocol state information, such as the transport protocol state information collected at 675 for reverse TCP packet 670) may be used to identify an end of the first request/response period 690. Examples of such processing of transport protocol state information for identifying beginnings and ends of request/response periods and generating corresponding request/response information are illustrated below, such as in example Algorithms 1 and 2.

Although Algorithms 1 and 2 do not illustrate such techniques, in some implementations and/or circumstances individual request/response periods may be identified, and corresponding request/response information generated, for individual request-response message pairs exchanged while request multiplexing is used. FIG. 6 illustrates three such request/response periods 692, 694, and 696. As can be seen from the example of request/response periods 692, 694, and 696, a request/response period identified for an individual multiplexed request and its corresponding response may overlap in time with one or more other request/response periods for the same transport protocol connection. Request/response information 435 may include information reflecting such overlaps. Techniques for processing request/response information, such as the classification of transport protocol connections performed by classifier 440, may be adapted to identify and/or account for such overlaps among request/response periods.

It is noted that to more clearly present and discuss the subject matter, additional TCP packets that may have been exchanged during the illustrated periods are intentionally not illustrated in FIGS. 5 and 6. For example, client endpoint 110 and/or server endpoint 160 may each have transmitted one or more "pure ACKs"—TCP messages that acknowledge TCP packets received from the other endpoint but do not include a TCP data payload. Examples of processing transport protocol state information for such additional TCP packets are illustrated in in example Algorithms 1 and 2.

Request/response information 435 generated by request/response identifier 430 (or multiple request/response identifiers 430, depending on the implementation) may be provided directly to classifier 440, quality of experience (QOE) estimator 460, and/or network performance monitor 470. For example, each time request/response identifier 430 identifies a new request/response period, its associated request/response information 435 may be provided to other systems, such as classifier 440, QOE estimator 460, and/or network performance monitor 470, for processing. In some implementations, request/response information generated by request/response identifier 430 may be stored, at network monitor 415 or at another system included in network 410, for archiving and/or later processing. Request/response information 435 generated by multiple request/response identifiers 430 may be aggregated for processing and/or storage at a common system. It is noted that by examining transport level (such as TCP-level) flows and information, the techniques described above for identifying request/response periods and generating corresponding request/response information are effective for both unencrypted (for example, unencrypted HTTP request-response exchanges) and encrypted (for example, HTTPS communications where presentation layer (OSI Layer 6) encryption has been used), allowing connections using encrypted communications to be usefully classified.

Classifier 440, which may be provided by a computing system, is configured to classify transport protocol connections, such as transport protocol connections monitored by network monitor 415, based on their respective request/response information 435. Algorithms 3 and 4, below, illustrate examples in which each transport protocol connection is classified into one of five categories or classifications.

(1) Transactional/Control—Such connections generally involve client endpoint 110 sending small requests, such as simple commands to start an action, stop an action, obtain status information, or modify a configuration setting, and server endpoint 160 sending small responses, such as simple acknowledgements or responses including a small amount of data.

(2) Streaming—For media streaming applications such as Youtube, Netflix, and Hulu, client endpoint 110 requests video or other streaming media data in chunks, especially if the media to be played is long. Typically, multiple bitrates are available to accommodate network capacity and/or condition, and after an initial time a client application settle at a fairly consistent bitrate and periodically request media segments of more or less the same size. Accordingly, for Streaming applications, response sizes have a prominent mode and/or times between successive requests are periodic. Additionally, as data chunks for substreams, such as a video substream and an accompanying audio substream, may be requested separately and have substantially different bitrates, a bi-modal distribution in response sizes may indicate a Streaming application. Additionally, instead of using a single transport protocol connection, most Streaming applications establish two or more simultaneous connections to request data chunks. Thus, instead of looking at only one period, multiple periods may be grouped together. For example, for one transport protocol connection, there may be inter-request times of 4, 8, 8, 16, and 4, implying the requests are periodic with a period of 4. In some examples, a connection may be classified as Streaming based on detected periodicity in inter-request times or determining a probability for a size or range of sizes, based on a probability distribution based on response sizes, exceeds a threshold probability.

(3) Interactive—One example common use of a web browser application at client endpoint 110 to visit a website at server endpoint 160. In practice, use of request multiplexing is mainly limited to Interactive applications, in part because the large number of resources requested for displaying a web page benefits significantly from request multiplexing. In contrast, Streaming applications rarely, if ever, use request multiplexing; instead, a Streaming application would likely benefit more from requesting larger data chunks in each request. Smaller response sizes (although larger than sizes associated with Transactional/Control applications) may be useful in classifying a transport protocol connection as Interactive where request multiplexing has not been identified.

(4) Bulk (Upload and/or Download)—Examples of this include file sharing and backup services. In general, request/response periods have very high response sizes (for example, for Bulk Download) or very high request sizes (for example, for Bulk Upload). Request multiplexing may be used by a Bulk application, in particular for Bulk Upload, it may be distinguished from request multiplexing done by an Interactive application based on size thresholds. In some implementations, Bulk Upload and Bulk Download may be classified separately, to allow network management system 450 and/or network 410 to respond differently based on the classification.

(5) Default—A default or "catchall" category. A transport protocol connection may be initially categorized as Default and subsequently recategorized, and/or may be categorized as Default where the request/response information 435 for the connection does not indicate one of the other categories applies.

Algorithm 3 illustrates an example of an "offline" classification algorithm, which is used to classify a transport protocol connection at, or sometime after, the end of the transport protocol connection. In this context, the term "offline" is merely a label to more conveniently distinguish classification performed after the end of a transport protocol connection, in contrast to "realtime" classification and "continuous" classification discussed below, each of which is used to classify a transport protocol connection before the end of the transport protocol connection. However, it is also noted that much as has been discussed above, transport protocol state information 420 and/or request/response information 435 may be stored for later processing, which may be useful for evaluating improvements to request/response identifier 430, classifier 440, quality of experience estimator 460, and/or network performance monitor 470 against historical activity on network 410. In Algorithm 3, the array Rrt contains all of the request/response information 435 generated for the TCP connection being classified, and returns a string and a numeric value indicating the classification for the TCP connection based on its request/response information 435.

Algorithm 3: Offline Connection Classification Using Request/Response Information

```
Function getConnClassification(Rrt,4tuple)
{
// This function is called after the connection has ended (FIN/RST) (or timed-out
for freeing up the CCB)
// The input is the rows of application-layer metrics (Rrt) from the function
// getAppMetrics(tcpHdrs,4tuple)
// Rrt stands for R-R-T - Request, Response & Timing information
// Reads the Application-layer / Object-level data from the 1st function, for the
current connection (4tuple)
// Where each row corresponds to a request-response cycle or an object exchange
// And each column describes the metrics for each object exchange
        // Column indices from 0 to 11:
        // 4tuple, Sr. No, Request Start Time, Response Start Time, Response End Time,
Request Size, Response Size, #RequestPKts, #RequestFragments, #MultiplexedRequest,
#ResponsePkts, #KeepAlives
// The output format for connection classification (cClass) is
        // (Class,code)
        // Where class is - Interactive, Streaming, Bulk, Control and Default
        // and code is for finer classification if desired
// Variables
countRrt=numRows(Rrt); //Total number of rows
dur=Rrt[countRrt-1,4]-Rrt[0,2]; // Total connection duration
        // Response End Time for last response - Request Start Time for first request
if (dur < threshDur | | countRrt < 1) {
// Classify as Default, if short connection or no/incomplete object-level data
    cClass=vector("Default",9); // Default
    return(cClass);
}
// Append two columns to Rrt
//-> next Request Start Time (from column 2 of next row), &
//-> Inter-Request Time (next Request Start Time - current Request Start Time)
if (countRrt>1) {
    tn=vector(Rrt[1:countRrt-1,2],Rrt[countRrt-1,4]); // Obtain next (shifted row)
Request Start Time
    irt=vector(tn)-vector(Rrt[0:countRrt-1,2]); // Obtain Inter-Request Time
    Rrt = appendColumns(Rrt,tn,irt);// Append the two columns
```

Algorithm 3: Offline Connection Classification Using Request/Response Information

```
} else { // Single row
   tn=Rrt[0,4];
   Rrt = appendColumns(Rrt,tn,tn-Rrt[0,2]);
}
// Statistics for Request Sizes
maxA=max(Rrt[,5]);
meanA=mean(Rrt[,5]);
// Statistics for Response Sizes
maxB=max(Rrt[,6]);
meanB=mean(Rrt[,6]);
// count the number of exchanges with Immediate GETs / Requests
immGets=sum(Rrt[0:max(0,countRrt-2),13]<=threshImmGetRTT);
// Count the number of exchanges with Pipeline / Multiplexed Requests
pipeGets=sum(Rrt[,9]> threshMultiplexedReq || Rrt[,8]> threshFrag );
if (meanA> highRequest_mean || maxA> highRequest_max) {
     cClass = vector("Bulk",0); // Bulk Upload
} else if (meanB>highResponse_mean || maxB > highResponse_max){
     cClass = vector("Bulk",1); // Bulk Download
} else if (meanB< lowResponse_mean && maxB <= lowResponse_max) {
     cClass = vector("Control",2); // Transactional / Control
} else if (meanB< lowResponse_mean && maxB > lowResponse_max) {
     cClass = vector("Control",3); // Transactional
} else if (pipeGets>= threshPipeGet || pipeGets/countRrt>= threshPipeGetRatio) {
     cClass = vector("Interactive",4); // Interactive - Multiplexed Requests
} else if(immGets >= threshImmGet) {
     cClass = vector("Interactive",5); // Interactive - Immediate Requests
} else {
     // Identify modes in Response Sizes(B) or Inter-Request Time (IRT)
     B=Rrt[,6]; // vector of Response Sizes
     // Round off to reduce the distinct values
     // Following scalar operation done on each element of the vector
     prunedB= round(B/10^floor(log10(B)-1)) * 10^floor(log10(B)-1);
     // Identify the modes & get it's pmf - probability mass function
     modeBPmf = getModePMF(pruned,2);
     // getModePMF( ) returns the pmf of the mode (most frequent value) if the
support (distinct values) <= 3
     // getModePMF( ) returns the sum of pmfs of the top two modes if the support >
3
     // First argument denotes the vector, and second argument tell the
     // maximum number of modes to consider
     // Similar steps to identify modes in Inter-Request Time
     prunedIrt= round(Rrt[,13] *10)/10); // Round-up up to 0.1 second accuracy
     // But first remove multiples & increment counter for the least value
     processedIrt=reduceMultiples(prunedIrt);
     // Eg: Consider 3 samples (frequency) of 2.0 seconds (value), 1 sample of
     // 3.0 seconds & 4 samples of 4.0 seconds (multiple of 2 seconds)
     // gets converted to 7 samples of 2.0 seconds & 1 sample of 3.0 seconds
     // Get only the PMF of the single mode (top 1st most frequent value)
     modeIrt=getModePMF(processedIrt,1);
     // Perform classification into remaining classes
     if (countRrt>=3 && (modeBPmf>= threshBPmf || modeIrt>= threshIrt)){
        cClass = vector("Streaming",6); // Streaming
     } else if (meanB < meanWebResponseSize) {
        cClass = vector("Interactive",7); // Interactive - light traffic
     } else {
        cClass = vector("Default",8); // Default
     }
}
return (cClass);
}
```

Figure 7:
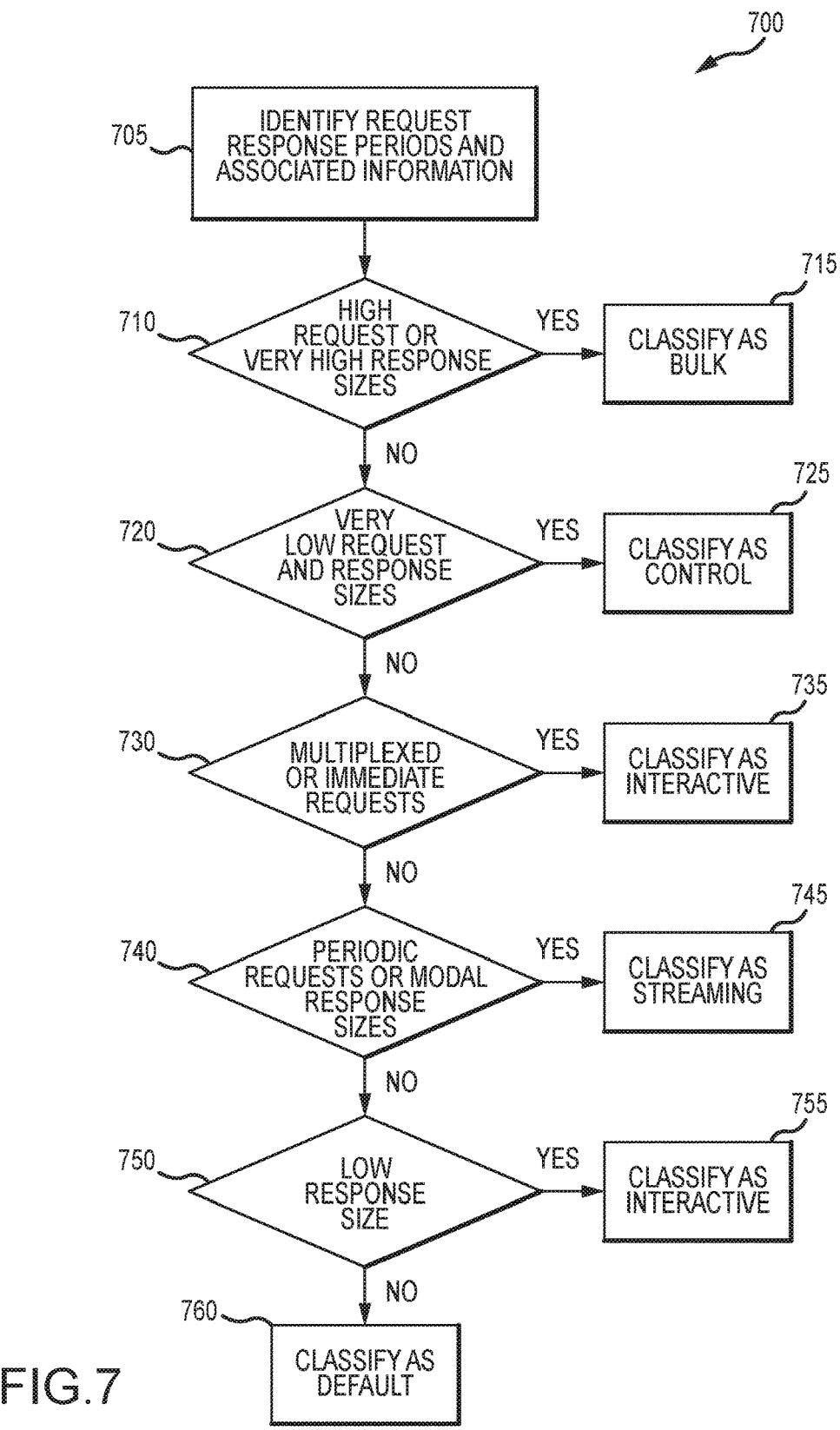
FIG. 7 illustrates an example of a process for "offline" classification of a transport protocol connection by a classifier system.

FIG. 7 illustrates an example of a process for "offline" classification of a transport protocol connection by classifier 440, that is similar in its approach to Algorithm 3. At 705, request/response information 435 for a transport protocol connection is identified and made available for classification of the transport protocol connection. In some implementations, classifier 440 may be invoked to classify a transport protocol connection in response to the transport protocol connection ending, resulting in a classification of the transport protocol connection shortly after the transport protocol connection has ended. This allows use of the resulting classification for classifying or modifying behavior of network 410 for other transport protocol connections, whether already establish or established later, or for other uses.

At 710, classifier 440 determines if the request/response information 435 for the transport protocol connection reflects high request sizes (associated with Bulk Upload classification) and/or very high response sizes (associated with Bulk Download classification). If so, the process continues to 715 at which the transport protocol connection is classified as Bulk; if not, the process continues to 720. Algorithm 3 illustrates an example in which high request sizes are determined to be present if a mean request size exceeds a threshold highRequest_mean, or if a maximum request size exceeds a threshold highRequest_max. Algorithm 3 further illustrates an example in which very high response sizes are determined to be present if a mean response size exceeds a threshold highResponse_mean, or if a maximum response size exceeds a threshold highResponse_max. In some implementations, instead of mean or maximum sizes, a predetermined percentile for sizes may be used; for example, what is the 75th percentile for request sizes (a size for which, statistically, 75% of request responses would be expected to be below for the observed request sizes). Appropriate values for these thresholds may be determined by use of Bulk applications, Bulk Upload applications, and/or Bulk Download applications, generating request/response information 435 as described above for transport protocol packets during such use, and selecting threshold values that result in Bulk, Bulk Upload, and/or Bulk Download categorization a desired fraction of the time. Determination of appropriate threshold values, and whether particular threshold values result in under- or over-inclusiveness, may be an interactive process. Additionally, as network, client endpoint, and server endpoint capabilities change over time, the threshold values may also change; for example, as network speeds increase, the threshold would likely also increase. In some implementations, an automated process may be implemented to periodically automatically execute one or more applications (via scripting or other techniques) so as to perform Bulk, Bulk Upload, and/or Bulk Download activities, automatically corresponding request/response information 435, and automatically process the request/response information 435 to determine appropriate threshold values.

At 720, classifier 440 determines if the request/response information 435 for the transport protocol connection reflects very low response sizes (or, in some examples, as illustrated in FIG. 7, very low request sizes and very low response sizes). If so, the process continues to 725 at which the transport protocol connection is classified as Transactional/Control; if not, the process continues to 730. Algorithm 3 illustrates an example in which very low response sizes are determined to be present if the mean response size is less than a threshold lowResponse_mean. Algorithm 3 further subcategorizes a Transactional/Control categorization based on whether the maximum response size is greater than a threshold lowResponse_max (in which case it is classified as Transactional). The techniques described for determining values for the thresholds described in connection with 710 may similarly be applied for the thresholds described in connection with 720. In some implementations, this may be done in conjunction with the techniques described for determining values for the thresholds described in connection with 710 to determine values for the thresholds described in connection with 710 and 720 that achieve desired classification results across the Bulk and Transactional/Control categories (and/or subcategories thereof).

At 730, classifier 440 determines if the request/response information 435 for the transport protocol connection reflects a significant amount of request multiplexing or immediate requests. If so, the process continues to 735 at which the transport protocol connection is classified as Interactive; if not, the process continues to 740. Algorithm 3 illustrates an example in which a significant amount of request multiplexing is determined to have occurred if the intermediate value pipeGets is greater than or equal to a threshold value threshPipeGet, or if the value pipeGets divided by the number of request/response periods is greater than or equal to a threshold threshPipeGetRatio. Algorithm 3 illustrates an example in which a significant amount of immediate requests are determined to have occurred if the intermediate value immGets is greater than or equal to a threshold value threshImmGet. The techniques described for determining values for the thresholds described in connection with 710 and/or 720 may similarly be applied for the thresholds described in connection with 730. In some implementations, this may be done in conjunction with the techniques described for determining values for the thresholds described in connection with 710 and/or 720 to determine values for the thresholds described in connection with 710, 720, and/or 730 that achieve desired classification results across two or more of the Bulk, Transactional/Control, and Interactive categories (and/or subcategories thereof).

At 740, classifier 440 determines if the request/response information 435 for the transport protocol connection reflects a significant occurrence of periodic requests or modal response sizes. If so, the process continues to 745 at which the transport protocol connection is classified as Streaming; if not, the process continues to 750. Algorithm 3 illustrates an example in which a significant occurrence of periodic requests or modal response sizes is determined to have happened if the intermediate value modeBPmf is greater than or equal to a threshold value threshBPmf, or if the intermediate value modeIrt is greater than or equal to a threshold threshIrt. Other statistical techniques may be used to calculate alternative intermediate values to modeBPmf, such as determining a probability for a size or range of sizes, based on a probability distribution based on the response sizes, and determining whether the probability exceeds a threshold value. The techniques described for determining values for the thresholds described in connection with 710, 720, and/or 730 may similarly be applied for the thresholds described in connection with 740. In some implementations, this may be done in conjunction with the techniques described for determining values for the thresholds described in connection with 710, 720, and/or 730 to determine values for the thresholds described in connection with 710, 720, 730, and/or 740 that achieve desired classification results across two or more of the Bulk, Transactional/Control, Interactive, and Streaming categories (and/or subcategories thereof).

At 750, classifier 440 determines if the request/response information 435 for the transport protocol connection reflects low response sizes. If so, the process continues to 755 at which the transport protocol connection is classified as Interactive; if not, the process continues to 760 and the transport protocol connection is classified as Default. Algorithm 3 illustrates an example in which low response sizes are determined to have occurred if the mean response size is less than a threshold value meanWebResponseSize. The techniques described for determining values for the thresholds described in connection with 710, 720, 730, and/or 740 may similarly be applied for the threshold meanWebResponseSize. In some implementations, this may be done in conjunction with the techniques described for determining values for the thresholds described in connection with 710, 720, 730, and/or 740 to determine values for the thresholds described in connection with 710, 720, 730, 740, and/or 750 that achieve desired classification results across two or more of the Bulk, Transactional/Control, Interactive, Streaming, and Default categories (and/or subcategories thereof).

Algorithm 4 illustrates an example of a "realtime" classification algorithm, which is used to classify a transport protocol connection before the end of the transport protocol connection. Although there are similarities to the flow and processing in Algorithm 3 and FIG. 7, there are some differences to avoid incorrect classification of a transport protocol connection prematurely. For example, classification of transport protocol connections into the Transaction/Control category is delayed significantly since many client-server request-response exchanges can begin with small request and/or response sizes.

Algorithm 4: Realtime Connection Classification Using Request/Response Information

```
Function getConnClassificationRT(Rrt,4tuple)
{
// Unlike Offline Classification, this function can be called after each object-
level metric updates (by getAppMetrics) or periodically
// The input is the rows of application-layer metrics (Rrt) from the function
getAppMetrics(tcpHdrs,4tuple)
// Reads the Application-layer / Object-level data from the 1st function , for the
current connection (key cport / client port)
// Reads as multiple rows, each row (per Object) describing:
       // Column indices from 0 to 11:
       // 4tuple, Sr. No, Request Start Time, Response Start Time, Response End Time,
Request Size, Response Size, #RequestPKts, #RequestFragments, #MultiplexedRequest,
#ResponsePkts, #KeepAlives
// The output format for connection classification (cClass) is
          // (Class,code)
          // Where class is - Interactive, Streaming, Bulk, Control / Default
          // and code is for finer classification if desired
// Variables
countRrt=rows(Rrt); //Total number of rows for object-level data
dur=Rrt[countRrt-1,4]-Rrt[0,2]; // Total connection duration
       // Response End Time for last response - Request Start Time for first request
if (dur < threshDur | countRrt < 1) { // Classify as Default, if short connection or
// no/incomplete object level data
   cClass = vector("Default",9); // No real-time classification yet
   return (cClass);
}
// Append two columns to Rrt
//-> next Request Start Time (from column 2 of next row), &
//-> Inter-Request Time (next Request Start Time - current Request Start Time)
if (countRrt>1) {
   tn=vector(Rrt[1:countRrt-1,2],Rrt[countRrt-1,4]); // Obtain next (shifted row)
Request Start Time
   irt=vector(tn)-vector(Rrt[0:countRrt-1,2]); // Obtain Inter-Request Time
   Rrt = appendColumns(Rrt,tn,irt); // Append the two columns
} else { // Single row
   tn=Rrt[0,4];
   Rrt = appendColumns(Rrt,tn,tn-Rrt[0,2]);
}
// Statistics for Request Sizes
maxA=max(Rrt[,5]);
meanA=mean(Rrt[,5]);
// Statistics for Response Sizes
maxB=max(Rrt[,6]);
meanB=mean(Rrt[,6]);
// count the number of Immediate GETs / Requests
immGets=sum(Rrt[0:max(0,countRrt-2),13]<=threshImmGetRTT);
// Count the number of Pipeline / Multiplexed Requests
pipeGets=sum(Rrt[,9]> threshMultiplexedReq | Rrt[,8]> threshFrag );
if (meanA > highRequest_mean | | maxA > highRequest_max) {
       cClass = vector("Bulk",0); // Bulk Upload
} else if (meanB > highResponse_mean | | maxB > highResponse_max){
       cClass = vector("Bulk",1); // Bulk Download
} else if (pipeGets>= threshPipeGet | | pipeGets/countRrt>= threshPipeGetRatio) {
       cClass = vector("Interactive",4); // Interactive - Multiplexed Requests
} else if(immGets >= threshImmGet) {
       cClass = vector("Interactive",5); // Interactive - Immediate Requests
} else {
       // Identify modes in Response Sizes(B) or Inter-Request Time (IRT)
       B=Rrt[,6]; // vector of Response Sizes
       // Round off to reduce the distinct values
       // Following scalar operation done on each element of the vector
       prunedB= round(B/10^floor(log10(B)-1)) * 10^floor(log10(B)-1);
       // Identify the modes & get it's pmf - probability mass function
       modeBPmf = getModePMF(pruned,2);
       // getModePMF( ) returns the pmf of the mode (most frequent value) if the
       // support (distinct values) <= 3
       // getModePMF( ) returns the sum of pmfs of the top two modes if the
       // support > 3
       // First argument denotes the vector, and second argument denotes the maximum
       // number of modes to consider
       // Similar steps to identify modes in Inter-Request Time
       prunedIrt= round(Rrt[,13]*10)/10); // Round-up up to 0.1 second accuracy
       // But first remove multiples & increment counter for the least value
       processedIrt=reduceMultiples(prunedIrt);
       // Eg: Consider 3 samples (frequency) of 2.0 seconds (value), 1 sample of 3.0
       // seconds & 4 samples of 4.0 seconds (multiple of 2 seconds)
       // gets converted to 7 samples of 2.0 seconds & 1 sample of 3.0 seconds
       // Get only the PMF of the single mode (top / 1st most frequent value)
       modeIrt=getModePMF(processedIrt,1);
```

Algorithm 4: Realtime Connection Classification Using Request/Response Information

```
    // Perform classification into remaining classes
    if (countRrt>=3 && (modeBPmf>= threshBPmf || modeIrt>= threshIrt)){
      cClass = vector("Streaming",6); // Streaming
    } else if ( dur >= threshDurRT) { // Long-enough connection to be considered
                                      // for remaining classes
      if (meanB< lowResponse_mean && maxB <= lowResponse_max) {
        cClass = vector("Control",2);    // Transactional / Control
      } else if (meanB< lowResponse_mean && maxB > lowResponse_max) {
        cClass = vector("Control",3);    // Transactional (possible change
                                         // to be considered ->
                                         // Interactive (Light) )
      } else if (meanB < meanWebResponseSize) {
        cClass = vector("Interactive",7); // Interactive - light
      }
    } else {
      cClass=c("Default",8); // No real-time classification yet
    }
  }
}
return (cClass);
}
```

Figure 8:
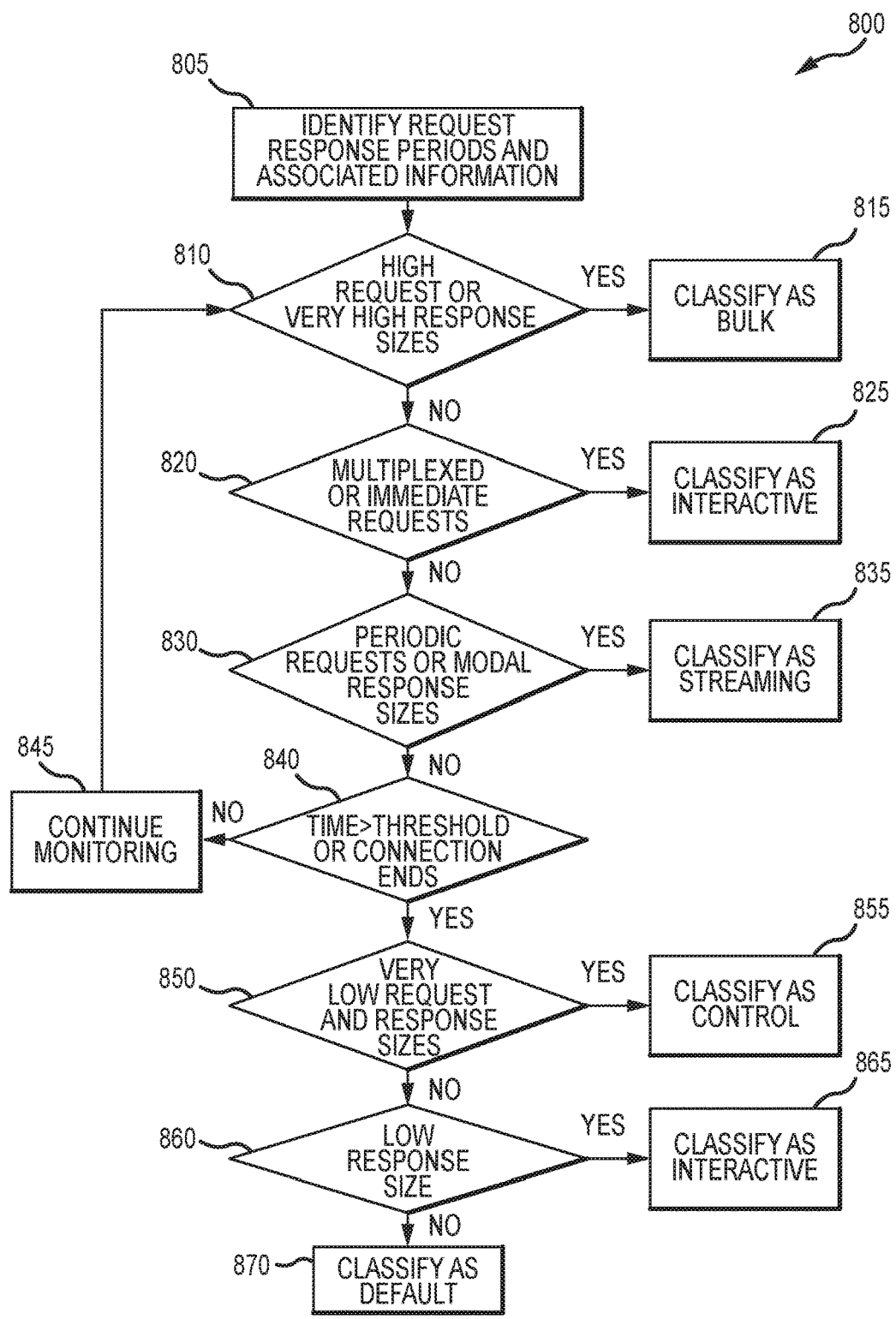
FIG. 8 illustrates an example of a process for "realtime" classification of a transport protocol connection by a classifier system.

FIG. 8 illustrates an example of a process for "realtime" classification of a transport protocol connection by classifier 440, that is similar in its approach to Algorithm 4. At 805, request/response information 435 for a transport protocol connection is identified and made available for classification of the transport protocol connection. In some implementations, classifier 440 may receive items of request/response information 435 as their respective request/response periods are identified by request/response identifier 430, possibly resulting in a classification of the transport protocol connection before the transport protocol connection has ended. This allows use of the resulting classification for modifying behavior of network 410 for the transport protocol connection that was classified, as well as for classifying or modifying behavior of network 410 for other transport protocol connections, whether already establish or established later, or for other uses.

At 810, classifier 440 determines if the received request/response information 435 for the transport protocol connection reflects high request sizes (associated with Bulk Upload classification) and/or very high response sizes (associated with Bulk Download classification). If so, the process continues to 815 at which the transport protocol connection is classified as Bulk; if not, the process continues to 820. Algorithm 4 illustrates an example in which high request sizes are determined to be present if a mean request size exceeds a threshold highRequest_mean, or if a maximum request size for the received request/response information 435 exceeds a threshold highRequest_max. Algorithm 4 further illustrates an example in which very high response sizes are determined to be present if a mean response size exceeds a threshold highResponse_mean, or if a maximum response size exceeds a threshold highResponse_max. In some implementations, instead of mean or maximum sizes, a predetermined percentile for sizes may be used; for example, what is the 75th percentile for request sizes (a size for which, statistically, 75% of request responses would be expected to be below for the observed request sizes). The techniques described for determining values for the thresholds described in connection with 710 may similarly be applied for the thresholds described in connection with 810.

At 820, classifier 440 determines if the received request/response information 435 for the transport protocol connection reflects a significant amount of request multiplexing or immediate requests. If so, the process continues to 825 at which the transport protocol connection is classified as Interactive; if not, the process continues to 830. Algorithm 4 illustrates an example in which a significant amount of request multiplexing is determined to have occurred if the intermediate value pipeGets is greater than or equal to a threshold value threshPipeGet, or if the value pipeGets divided by the number of request/response periods is greater than or equal to a threshold threshPipeGetRatio. Algorithm 4 illustrates an example in which a significant amount of immediate requests are determined to have occurred if the intermediate value immGets is greater than or equal to a threshold value threshImmGet. The techniques described for determining values for the thresholds described in connection with 810 may similarly be applied for the thresholds described in connection with 820. In some implementations, this may be done in conjunction with the techniques described for determining values for the thresholds described in connection with 810 to determine values for the thresholds described in connection with 810 and 820 that achieve desired classification results across the Bulk and Interactive categories (and/or subcategories thereof).

At 830, classifier 440 determines if the received request/response information 435 for the transport protocol connection reflects a significant occurrence of periodic requests or modal response sizes. If so, the process continues to 835 at which the transport protocol connection is classified as Streaming; if not, the process continues to 840. Algorithm 4 illustrates an example in which a significant occurrence of periodic requests or modal response sizes is determined to have happened if the intermediate value modeBPmf is greater than or equal to a threshold value threshBPmf, or if the intermediate value modeIrt is greater than or equal to a threshold threshIrt. Other statistical techniques may be used to calculate alternative intermediate values to modeBPmf, such as determining a probability for a size or range of sizes, based on a probability distribution based on the response sizes, and determining whether the probability exceeds a threshold value. The techniques described for determining values for the thresholds described in connection with 810 and/or 820 may similarly be applied for the thresholds described in connection with 830. In some implementations, this may be done in conjunction with the techniques described for determining values for the thresholds described in connection with 810 and/or 820 to determine values for the thresholds described in connection with 810,

820, and/or 830 that achieve desired classification results across two or more of the Bulk, Interactive, and Streaming categories (and/or subcategories thereof).

At 840, classifier 440 determines whether the amount of time the transport protocol connection has been established is equal to or greater than a threshold amount of time (or, in some examples, as illustrated in FIG. 8, whether the amount of time the transport protocol connection has been established is equal to or greater than a threshold amount of time or that the transport protocol connection has ended). If so, the process continues to 850; if not, the process continues to 845 and then back to 810, once request/response information 435 for another request/response period is provided to classifier 440. For example, the threshold amount of time may be approximately 60 seconds. The threshold amount of time may be set or adjusted to ensure that transport protocol connections have been established a sufficient amount of time to avoid incorrect classifications at 855, 865, and 870.

At 850, classifier 440 determines if the received request/response information 435 for the transport protocol connection reflects very low response sizes (or, in some examples, as illustrated in FIG. 8, very low request sizes and very low response sizes). If so, the process continues to 855 at which the v connection is classified as Transactional/Control; if not, the process continues to 860. Algorithm 4 illustrates an example in which very low response sizes are determined to be present if the mean response size is less than a threshold lowResponse_mean. Algorithm 4 further subcategorizes a Transactional/Control categorization based on whether the maximum response size is greater than a threshold lowResponse_max (in which case it is classified as Transactional). The techniques described for determining values for the thresholds described in connection with 810, 820, 830, and/or 840 may similarly be applied for the thresholds described in connection with 850. In some implementations, this may be done in conjunction with the techniques described for determining values for the thresholds described in connection with 810, 820, 830, and/or 840 to determine values for the thresholds described in connection with 810, 820, 830, 840, and/or 850 that achieve desired classification results across two or more of the Bulk, Transactional/Control, Interactive, Streaming, and Default categories (and/or subcategories thereof).

At 860, classifier 440 determines if the received request/response information 435 for the transport protocol connection reflects low response sizes. If so, the process continues to 865 at which the transport protocol connection is classified as Interactive; if not, the process continues to 870 and the transport protocol connection is classified as Default. Algorithm 4 illustrates an example in which low response sizes are determined to have occurred if the mean response size is less than a threshold value meanWebResponseSize. The techniques described for determining values for the thresholds described in connection with 810, 820, 830, 840, and/or 850 may similarly be applied for the meanWebResponseSize threshold. In some implementations, this may be done in conjunction with the techniques described for determining values for the thresholds described in connection with 810, 820, 830, 840, and/or 850 to determine values for the thresholds described in connection with 810, 820, 830, 840, 850, and/or 860 that achieve desired classification results across two or more of the Bulk, Transactional/Control, Interactive, Streaming, and Default categories (and/or subcategories thereof).

Although the same variable names have been used for a number of thresholds in Algorithms 3 and 4, one or more threshold values for Algorithm 3 may not achieve the same results in Algorithm 4. In some implementations, for the various thresholds discussed in connection with Algorithms 3 and 4 and FIGS. 7 and 8, different threshold values may be used based on subscriber information, service level agreements, groups of client endpoints, groups of CPEs, and groups of server endpoints. Additionally, although various orders of operations and various comparisons, combinations of comparisons, and orders of comparisons are illustrated in Algorithms 3 and 4 and FIGS. 7 and 8, these may be changed to yield adjusted classifications or classifications with different priorities.

In Algorithms 3 and 4, the Bulk category is further subdivided into Bulk Upload (with an associated numeric value of 0) and Bulk Download (with an associated numeric value of 1), the Transactional/Control category is further subdivided into a Transactional category (where the maximum receive size is above a threshold amount, and with an associated numeric value of 3) and a Transactional/Control category (with an associated numeric value of 2), and the Immediate category is further subdivided into Interactive—Multiplexed Requests (with an associated numeric value of 4) and Interactive—Immediate Requests (with an associated numeric value of 5).

Algorithms 3 and 4 are simply provided as examples of how classifier 440 may classify transport protocol connections based on the request/response information 435 for those connections. Algorithms 3 and 4 may be modified, or other algorithms employed, which make use of additional conditions or generate additional metrics (as part of a process used by request/response identifier 430 to generate request/response information 435, and/or as part of the processing done by classifier 440), such as average request and response sizes, to handle corner or borderline cases, or establish additional categories. Categorization accuracy may be improved by utilizing additional types of request/response information as conditions, such as size and/or timing distributions. Additionally, this information can be combined with other IP-layer metrics or flow classification based metrics (such as total connection duration, packets exchanged, etc.). Also, instead of using a rule-based approach, machine-learning techniques can be used to run the classification, using the request/response information as part of the input feature set. Use of TCP sequence numbers, such as in connection with associated acknowledgement values as illustrated in the example Algorithms 3 and 4, is useful for avoiding issues encountered with conventional approaches, relying on inter-packet statistics, under congested or lossy network conditions, as can often occur on wireless communication connections. Using TCP sequence numbers also makes it possible to estimate the request/response information with higher granularity and accuracy, when compared to conventional approaches using IP-layer stats. For example, with use of TCP sequence numbers it is easy to discard packet retransmissions and avoid skewing the derived metrics. Accordingly, the techniques described herein are more robust to changing network dynamics (losses & delays) than conventional approaches.

In some implementations, classifier 440 may be implemented in the same computer system as request/response identifier 430 and/or network monitor 415. For example, CPE 230 may be configured to spoof TCP connections using proxy 235 (for example, one or more TCP connections between client endpoint 110 (and/or other client endpoints) and server endpoint 160 (and/or other server endpoints), collect transport protocol state information for the local TCP connections of the spoofed connections (for example, local TCP connections between client endpoint 110 and proxy 235), generate request/response information based on the collected transport protocol state information, and classify the monitored spoofed TCP connections based on the request/response information. Additionally, some of all of the transport protocol state information collected by, request/response information generated by, and/or classifications made by that particular example may be provided to another computer system, such as a computer system in ISP network 140.

Classification database 445 may be used to store classification determinations for transport protocol connections, in association with information about the transport protocol connections (including, for example, information about a server endpoint associated with each transport protocol connection), and may be configured to make classifications of transport protocol connections available to other computer systems included in network 410. For example, transport protocol connection classifications may be made available to a network management system 450 included in network 410. Network management system 450 may be configured to adjust operational and performance parameters of various systems included in network 410. For example, based on a realtime classification of a transport protocol connection as being Interactive, and quality of service (QoS) engine included in CPE 330 or gateway 350 may be modified to reduce latency to improve responsiveness of the interactive experience. As a result, this may control behavior of the communication network by prioritization or deprioritization for transferring of data via the communication network between the client endpoint and the server endpoint based on classification determinations obtained from classification database 445. Although FIG. 4 illustrates classification database 445 as being included in classifier 440, in some examples it may be included in one or more other computing systems.

In some examples, classification database 445 may store a classification for a destination address (such as an IP address) in a history table. In some examples, a source address may be characterized by associating it with the dominant classifications for its connections. In some examples, a destination address may be associated with a calling FQDN (fully qualified domain name) based on DNS request-response history and/or a new DNS request-response, and classification database may store a classification in association with the FQDN in a history table. Such information and associations may be used to perform an initial classification of a connection, and adjust network operations in response to the classification.

Quality of Experience system 460 may make use of both request/response information 435 and information provided by classification database 445. For example, request/response information 435 can be used to estimate quality-of-experience (QoE) without relying on active tests. Quality of Experience system 460 can, for example, estimate HTTP response time (including server latency and network RTT), available application-layer upload and download throughput, and web page load time.

Network performance monitor 470 may make use of request/response information 435. For example, request/response information 435 can be used to estimate latency (delay in request and response) and throughput (size/time) as key network performance indicators.

Figure 9:
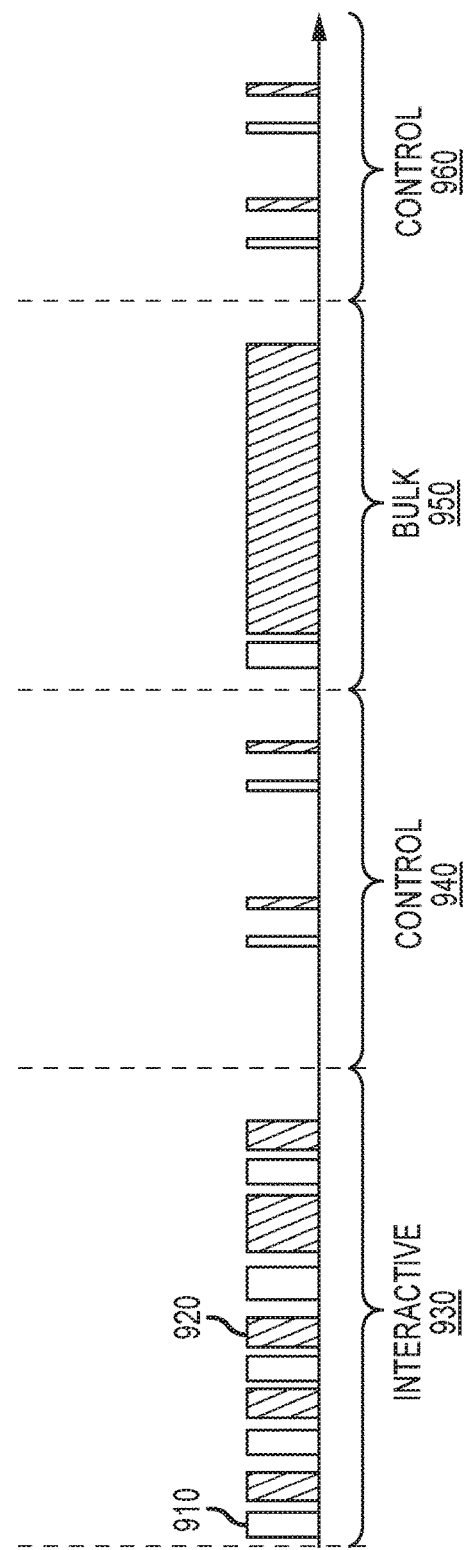
FIG. 9 illustrates an example of performing "continuous" classification of a transport protocol connection.

FIG. 9 illustrates an example of performing "continuous" classification of a transport protocol connection. Instead of performing a single offline classification for a transport protocol connection that has ended, or a single realtime classification of an ongoing transport protocol connection, continuous classification allows for classification and one or more subsequent reclassifications of the transport protocol connection in response to varying traffic characteristics over the duration of the transport protocol connection. As single persistent connections are used more and more, particularly for HTTP/2 web-based applications, traffic on a single transport protocol connection to a server endpoint may be suitably classified differently over different periods of time. FIG. 9 illustrates an example of such a transport protocol connection, with forward transport protocol packets 910 (for example, HTTP requests) and reverse transport protocol packets 920 (for example, HTTP responses) being exchanged over time via the transport protocol connection. During an initial first period 930, the transport protocol connection may be used for a quick series of requests and replies associated with first visiting a web service, and accordingly the transport protocol connection is classified as Interactive. During a second period 940, the transport protocol connection may be mostly idle, with infrequent and small requests and/or responses, and accordingly be reclassified as Transaction/Control. During a third period 950, the transport protocol connection may be used for a period of uploading and/or downloading attachments to a web-based email or social media component of the web service, and accordingly be reclassified as Bulk. During a fourth period 960, the transport protocol connection may again become mostly idle, and again be reclassified as Transaction/Control. Techniques similar to Algorithm 4 or FIG. 8 may be used to perform classification based on request/response information 435. In some implementations, classification may be periodically restarted, or a sliding window for identified request/response periods may be used, and reclassification may occur in response to a new classification being determined or a new classification being repeatedly identified over multiple slices of time.

Figure 10:
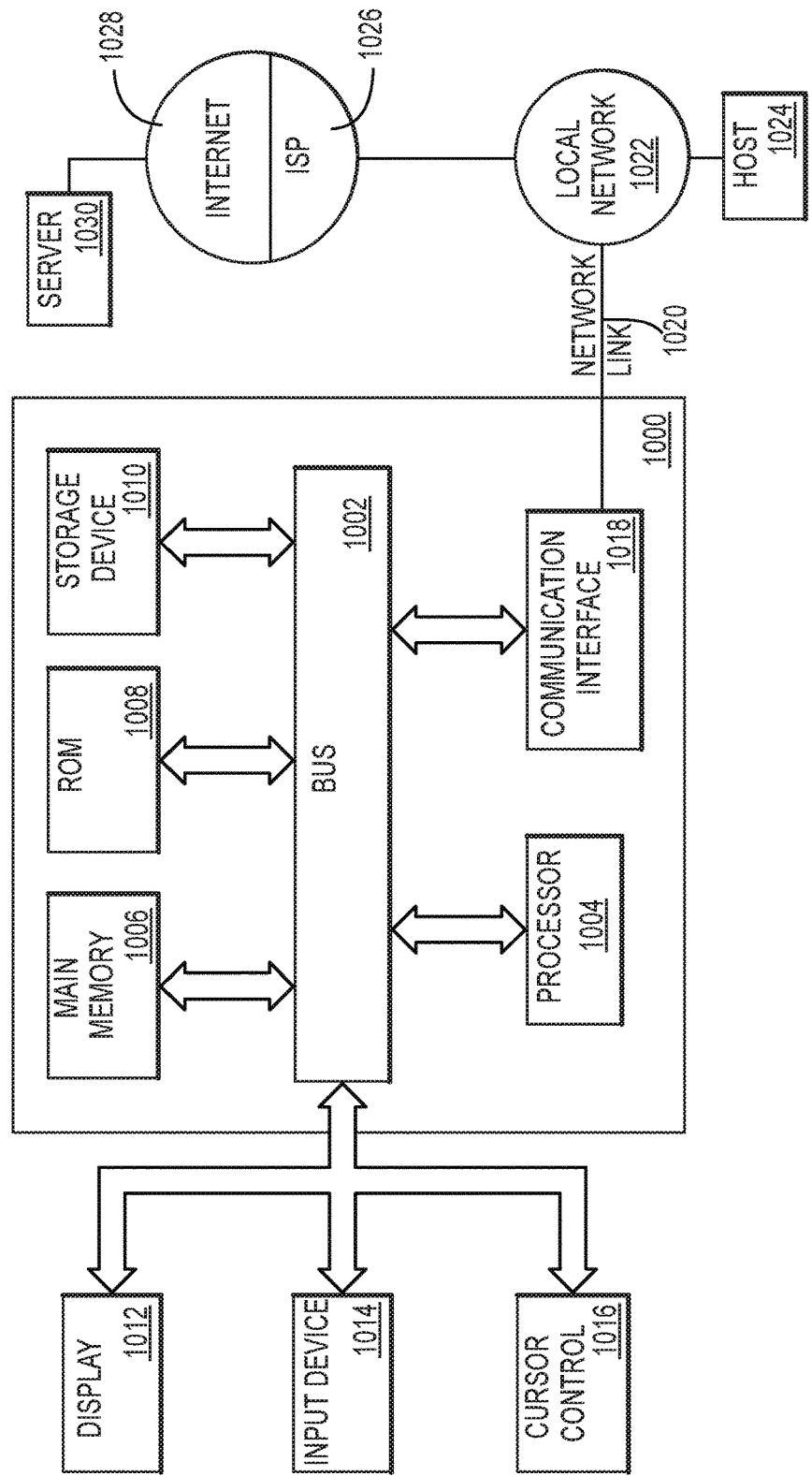
FIG. 10 is a block diagram that illustrates a computer system upon which aspects of this disclosure may be implemented.

FIG. 10 is a block diagram that illustrates a computer system 1000 upon which aspects of this disclosure may be implemented, such as, but not limited to, client endpoint 110 (and other such client endpoints), wireless access point 120, CPEs 1330, 230, and 330, computer systems included in ISP network 140, computer systems included in WAN 150, server endpoint 160 (and other such server endpoints), proxy 235 (or proxies executing on other computer systems, as discussed above), orbital satellite 340, gateway 350, computer systems included in network 410, network monitor 415, request/response identifier 430, classifier 440, network management system 450, QOE estimator 460, and network performance monitor 470. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT) or liquid crystal display (LCD), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. Another type of user input device is a touchscreen, which generally combines display 1012 with hardware that registers touches upon display 1012.

This disclosure is related to the use of computer systems such as computer system 1000 for implementing the techniques described herein. In some examples, those techniques are performed by computer system 1000 in response to processor 1004 executing one or more sequences of one or more instructions contained in main memory 1006. Such instructions may be read into main memory 1006 from another machine-readable medium, such as storage device 1010. Execution of the sequences of instructions contained in main memory 1006 causes processor 1004 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 1000, various machine-readable media are involved, for example, in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution. In this manner, computer system 1000 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A computer-implemented method comprising:
    obtaining transport protocol state information for each of a first plurality of transport protocol packets received at a network node, each of the first plurality of transport protocol packets including data transferred between a client endpoint and a server endpoint via a transport protocol connection, the first plurality of transport protocol packets including a first plurality of forward packets each including data transferred from the client endpoint to the server endpoint and a first plurality of reverse packets each including data transferred from the server endpoint to the client endpoint;
    identifying a first plurality of request/response periods for the transport protocol connection, each of the first plurality of request/response periods being identified based on the transport protocol state information obtained for one or more of the first plurality of forward packets and the transport protocol state information obtained for one or more of the first plurality of reverse packets, the first plurality of request/response periods including first and second request/response periods, and the identifying the first plurality of request/response periods including:
        identifying a beginning of the first request/response period based on the transport protocol state information for a first forward packet included in the first plurality of forward packets,
        calculating a first expected sequence number based on the transport protocol state information for a reverse packet included in the first plurality of reverse packets, and
        identifying an end of the first request/response period and a beginning of the second request/response period based on an acknowledgement value for the second forward packet corresponding to the first expected sequence number;
    associating a first application type with the server endpoint based on the first plurality of request/response periods; and
    controlling behavior of a communication network for transmission of a second plurality of transport protocol packets transferred to the server endpoint based on the first application type.

2. The method of claim 1, wherein the second plurality of transport protocol packets each include data transferred between the client endpoint and the server endpoint via the transport protocol connection.

3. The method of claim 2, further comprising:
    obtaining transport protocol state information for each of the second plurality of transport protocol packets, the second plurality of transport protocol packets including a second plurality of forward packets each including data transferred from the client endpoint to the server endpoint and a second plurality of reverse packets each including data transferred from the server endpoint to the client endpoint;
    identifying a second plurality of request/response periods for the transport protocol connection, each of the second plurality of request/response periods being identified based on the transport protocol state information obtained for one or more of the second plurality of forward packets and the transport protocol state information obtained for one or more of the second plurality of reverse packets;
    associating a second application type with the server endpoint based on the second plurality of request/response periods; and
    modifying behavior of the communication network for transmission of data transferred between the client endpoint and the server endpoint via the transport protocol connection in response to the second application type being different than the first application type.

4. The method of claim 1, further comprising:
    determining that request multiplexing was performed by the client endpoint during a request/response period included in the first plurality of request/response periods based on the transport protocol state information; and
    associating an interactive application type with the server endpoint based on the determination that request multiplexing was performed by the client endpoint during a request/response period.

5. The method of claim 4, wherein the determination that request multiplexing was performed by the client endpoint comprises:

calculating a second expected sequence number based on the transport protocol state information for a reverse packet included in the first plurality of reverse packets; and determining that an acknowledgement value for a forward packet included in the first plurality of forward packets does not correspond to the second expected sequence number.

6. The method of claim 1, further comprising:

determining an inter-request time for each of the first plurality of request/response periods, the inter-request time indicating an amount of time between a request/response period and a successive request/response period; and associating a media streaming application type with the server endpoint based on detected periodicity in the inter-request times.

7. The method of claim 1, further comprising:

determining a request size or a response size for each of the first plurality of request/response periods, the request size based on transport protocol payload sizes for packets included in the first plurality of forward packets and the response sizes based on transport protocol payload sizes for packets included in the first plurality of reverse packets;

determining a mean request size, a maximum request size, a predetermined percentile for request sizes, a mean response size, a maximum response size, or a predetermined percentile for response sizes for the first plurality of request/response periods; and associating a bulk application type with the server endpoint based on the mean request size, the maximum request size, the predetermined percentile for request sizes, the mean response size, the maximum response size, of the predetermined percentile for response sizes being equal to or greater than a respective threshold value.

8. The method of claim 1, wherein the controlling behavior of the communication network comprises selectively performing TCP spoofing on the second plurality of transport protocol packets based on the first application type.

9. The method of claim 1, wherein the controlling behavior of the communication network comprises prioritization or deprioritization for transferring of data via the communication network between the client endpoint and the server endpoint based on the first application type.

10. The method of claim 1, further comprising:

determining a response size for each of the first plurality of request/response periods;

determining a probability for a size or range of sizes based on a probability distribution based on the response sizes; and associating a media streaming application type with the server endpoint when the probability for a size or range of sizes exceeds a threshold probability.

11. A nontransitory computer readable medium including instructions which, when executed by one or more processors, cause the one or more processors to perform the method of claim 1.

12. A system comprising:

one or more processors; and one or more nontransitory computer readable media including instructions which, when executed by one or more processors, cause the one or more processors to:

obtain transport protocol state information for each of a first plurality of transport protocol packets received at a network node, each of the first plurality of transport protocol packets including data transferred between a client endpoint and a server endpoint via a transport protocol connection, the first plurality of transport protocol packets including a first plurality of forward packets each including data transferred from the client endpoint to the server endpoint and a first plurality of reverse packets each including data transferred from the server endpoint to the client endpoint;

identify a first plurality of request/response periods for the transport protocol connection, each of the first plurality of request/response periods being identified based on the transport protocol state information obtained for one or more of the first plurality of forward packets and the transport protocol state information obtained for one or more of the first plurality of reverse packets, the first plurality of request/response periods including first and second request/response periods, and the identifying the first plurality of request/response periods including:

identify a beginning of the first request/response period based on the transport protocol state information for a first forward packet included in the first plurality of forward packets, calculate a first expected sequence number based on the transport protocol state information for a reverse packet included in the first plurality of reverse packets, and identify an end of the first request/response period and a beginning of the second request/response period based on an acknowledgement value for the second forward packet corresponding to the first expected sequence number;

associate a first application type with the server endpoint based on the first plurality of request/response periods; and control behavior of a communication network for transmission of a second plurality of transport protocol packets transferred to the server endpoint based on the first application type.

13. The system of claim 12, wherein the second plurality of transport protocol packets each include data transferred between the client endpoint and the server endpoint via the transport protocol connection.

14. The system of claim 13, wherein the instructions further cause the one or more processors to:

obtain transport protocol state information for each of the second plurality of transport protocol packets, the second plurality of transport protocol packets including a second plurality of forward packets each including data transferred from the client endpoint to the server endpoint and a second plurality of reverse packets each including data transferred from the server endpoint to the client endpoint;

identify a second plurality of request/response periods for the transport protocol connection, each of the second plurality of request/response periods being identified based on the transport protocol state information obtained for one or more of the second plurality of forward packets and the transport protocol state information obtained for one or more of the second plurality of reverse packets;

associate a second application type with the server endpoint based on the second plurality of request/response periods; and modify behavior of the communication network for transmission of data transferred between the client endpoint and the server endpoint via the transport protocol connection in response to the second application type being different than the first application type.

15. The system of claim 12, wherein the instructions further cause the one or more processors to:
determine that request multiplexing was performed by the client endpoint during a request/response period included in the first plurality of request/response periods based on the transport protocol state information; and
associate an interactive application type with the server endpoint based on the determination that request multiplexing was performed by the client endpoint during a request/response period.

16. The system of claim 15, wherein the determination that request multiplexing was performed by the client endpoint comprises:
calculating a second expected sequence number based on the transport protocol state information for a reverse packet included in the first plurality of reverse packets; and
determining that an acknowledgement value for a forward packet included in the first plurality of forward packets does not correspond to the second expected sequence number.

17. The system of claim 12, wherein the instructions further cause the one or more processors to:
determine an inter-request time for each of the first plurality of request/response periods, the inter-request time indicating an amount of time between a request/response period and a successive request/response period; and
associate a media streaming application type with the server endpoint based on detected periodicity in the inter-request times.

18. The system of claim 12, wherein the instructions further cause the one or more processors to:
determine a request size and a response size for each of the first plurality of request/response periods, the request size based on transport protocol payload sizes for packets included in the first plurality of forward packets and the response sizes based on transport protocol payload sizes for packets included in the first plurality of reverse packets;
determine a mean request size, a maximum request size, a predetermined percentile for request sizes, a mean response size, a maximum response size, and a predetermined percentile for response sizes for the first plurality of request/response periods; and
associate a bulk application type with the server endpoint based on the mean request size, the maximum request size, the predetermined percentile for request sizes, the mean response size, the maximum response size, of the predetermined percentile for response sizes being equal to or greater than a respective threshold value.

19. The system of claim 12, wherein the controlling behavior of the communication network comprises prioritization or deprioritization for transferring of data via the communication network between the client endpoint and the server endpoint based on the first application type.

20. The system of claim 12, wherein the instructions further cause the one or more processors to:
determine a response size for each of the first plurality of request/response periods;
determine a probability for a size or range of sizes based on a probability distribution based on the response sizes; and
associate a media streaming application type with the server endpoint when the probability for a size or range of sizes exceeds a threshold probability.

* * * * *